US012647165B2

(12) United States Patent
Katla et al.

(10) Patent No.: US 12,647,165 B2
(45) Date of Patent: Jun. 2, 2026

(54) METHODS, ARCHITECTURES, APPARATUSES AND SYSTEMS FOR ADAPTIVE LEARNING AIDED PRECODER FOR CHANNEL AGING IN MIMO SYSTEMS

(71) Applicant: InterDigital Patent Holdings, Inc., Wilmington, DE (US)

(72) Inventors: Satyanarayana Katla, London (GB); Onur Sahin, London (GB)

(73) Assignee: InterDigital Patent Holdings, Inc., Wilmington, DE (US)

( * ) Notice: Subject to any disclaimer, the term of this patent is extended or adjusted under 35 U.S.C. 154(b) by 303 days.

(21) Appl. No.: 18/026,986

(22) PCT Filed: Sep. 23, 2021

(86) PCT No.: PCT/US2021/051659
§ 371 (c)(1),
(2) Date: Mar. 17, 2023

(87) PCT Pub. No.: WO2022/066843
PCT Pub. Date: Mar. 31, 2022

(65) Prior Publication Data
US 2023/0353208 A1 Nov. 2, 2023

Related U.S. Application Data

(60) Provisional application No. 63/082,620, filed on Sep. 24, 2020.

(51) Int. Cl.
*H04B 7/06* (2006.01)

(52) U.S. Cl.
CPC ......... *H04B 7/0626* (2013.01); *H04B 7/0623* (2013.01)

(58) Field of Classification Search
None
See application file for complete search history.

(56) References Cited

U.S. PATENT DOCUMENTS

2020/0112355 A1 4/2020 Park et al.
2021/0351885 A1* 11/2021 Chavva .................... G06N 3/08

OTHER PUBLICATIONS

Erick Dahlman et al., "5G NR: The next generation wireless access technology," Elsevier, 2018, 467 pages.
(Continued)

*Primary Examiner* — Minh Trang T Nguyen
(74) *Attorney, Agent, or Firm* — Mark D. Pratt

(57) ABSTRACT

Procedures, methods, architectures, apparatuses, systems, devices, and computer program products that may be implemented in a wireless transmit/receive unit (WTRU) and/or a network access point (NAP) with respect to MIMO precoding using a precoding neural network (NN) at the NAP. Training of the NN may use artificial and/or measured channel state information (CSI). In one embodiment, the WTRU may provide feedback to the NAP in the form of CSI statistics, time correlation, and/or bit error rate (BER) regarding a channel. The NAP may inform the WTRU of information for extracting training samples which are fed back from the WTRU to the NAP. The NAP may perform retraining of the NN using the training samples to adjust and/or recalibrate the NN weights. The information for extracting training samples may include CSI reference signal (CSI-RS) density and/or CSI-RS transmission time slots for extracting the training samples at the WTRU.

20 Claims, 20 Drawing Sheets

(56)                    References Cited

OTHER PUBLICATIONS

E. Bjornson et. al., "Massive MIMO is a Reality—What is Next? Five Promising Research Directions for Antenna Arrays," arXiv:1902. 07678v2, Jun. 12, 2019.

R. Chopra et al.; Analysis of Non-Orthogonal Training in Massive MIMO under Channel Aging with SIC Receivers, IEEE Signal Proces. Letters, vol. 26, No. 2, Feb. 2019, 5 pages.

Lars Thiele et al., "Channel Aging Effects in COMP Transmission: Gains from Linear Channel Prediction," in Proc. IEEE, Asilomar 2011, 5 pages.

K. Truong and R.W. Heath; "Effects of Channel Aging in Massive MIMO Systems," Journal of Communications and Networks, vol. 15, No. 4, Aug. 2013, 14 pages.

* cited by examiner

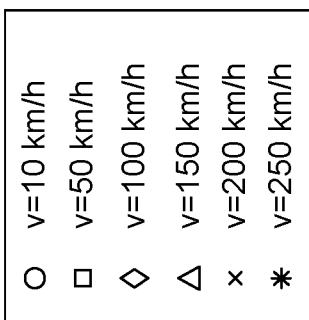
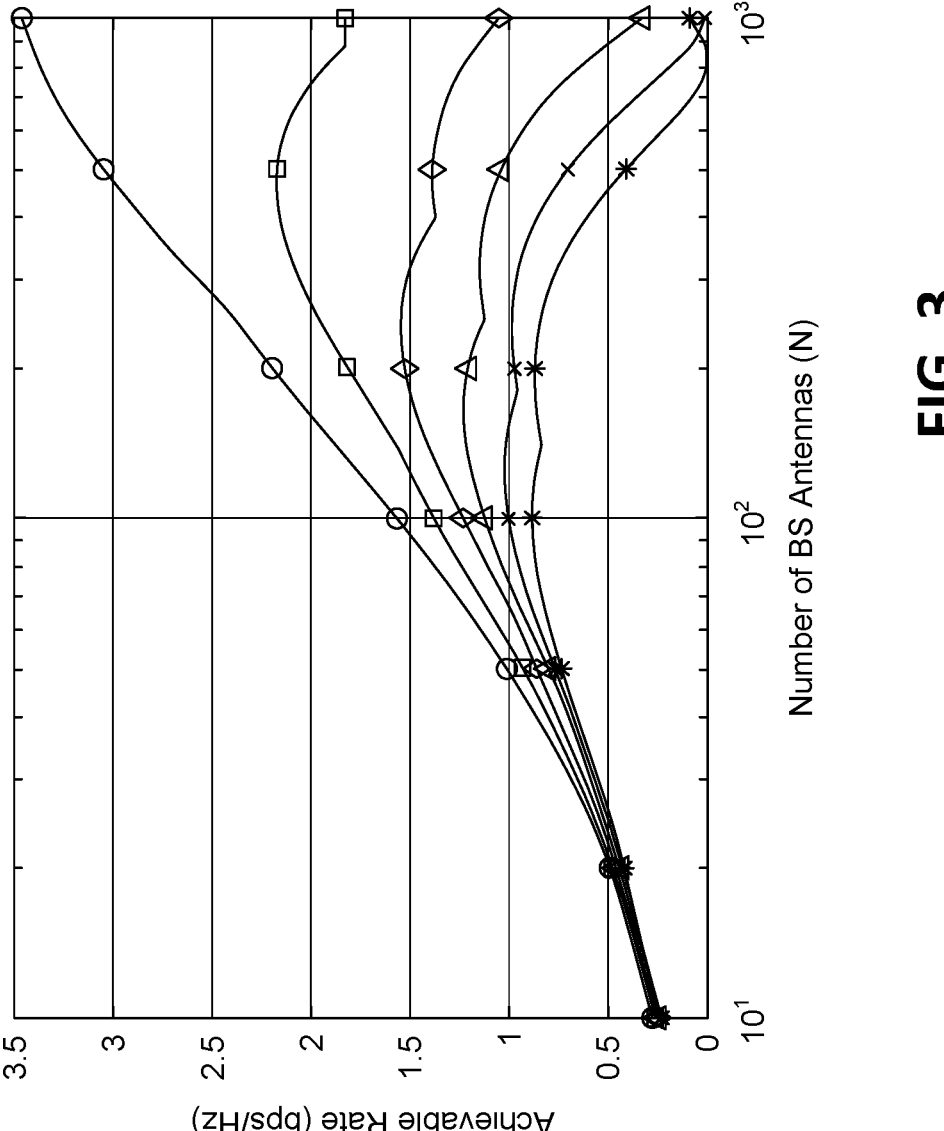
FIG. 3

600

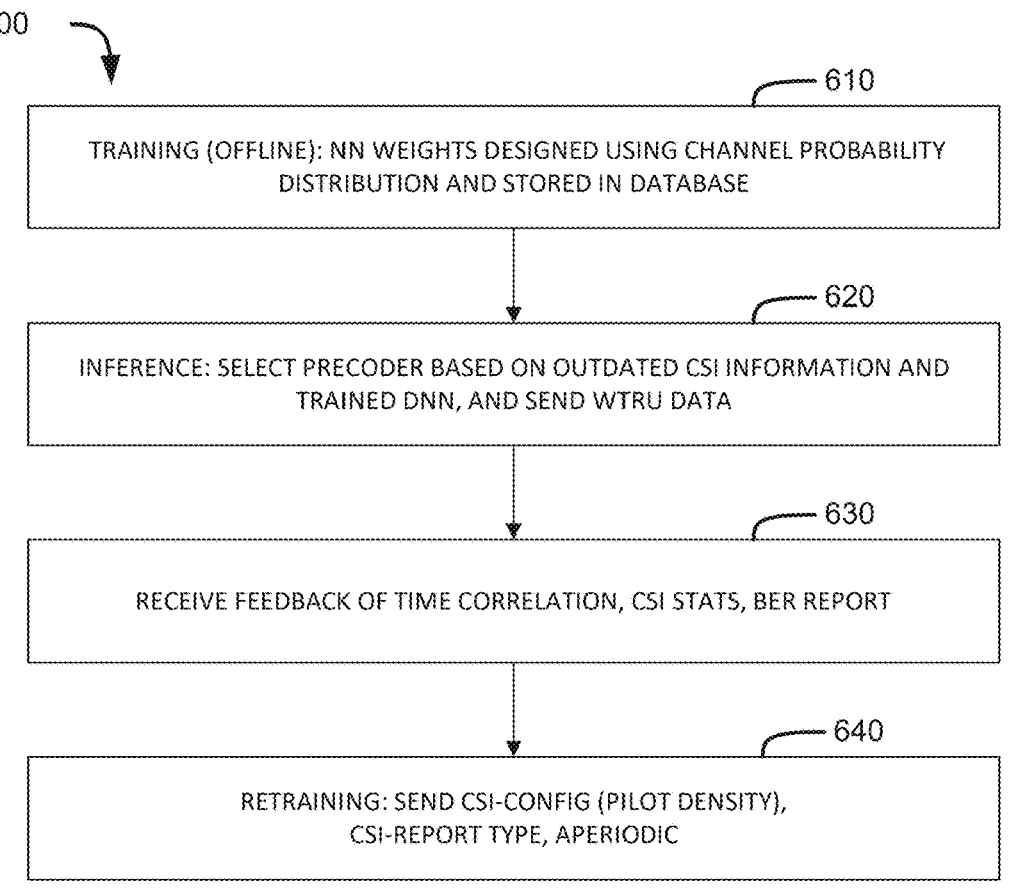

| 610 |
| --- |
| TRAINING (OFFLINE): NN WEIGHTS DESIGNED USING CHANNEL PROBABILITY DISTRIBUTION AND STORED IN DATABASE |

| 620 |
| --- |
| INFERENCE: SELECT PRECODER BASED ON OUTDATED CSI INFORMATION AND TRAINED DNN, AND SEND WTRU DATA |

| 630 |
| --- |
| RECEIVE FEEDBACK OF TIME CORRELATION, CSI STATS, BER REPORT |

| 640 |
| --- |
| RETRAINING: SEND CSI-CONFIG (PILOT DENSITY), CSI-REPORT TYPE, APERIODIC |

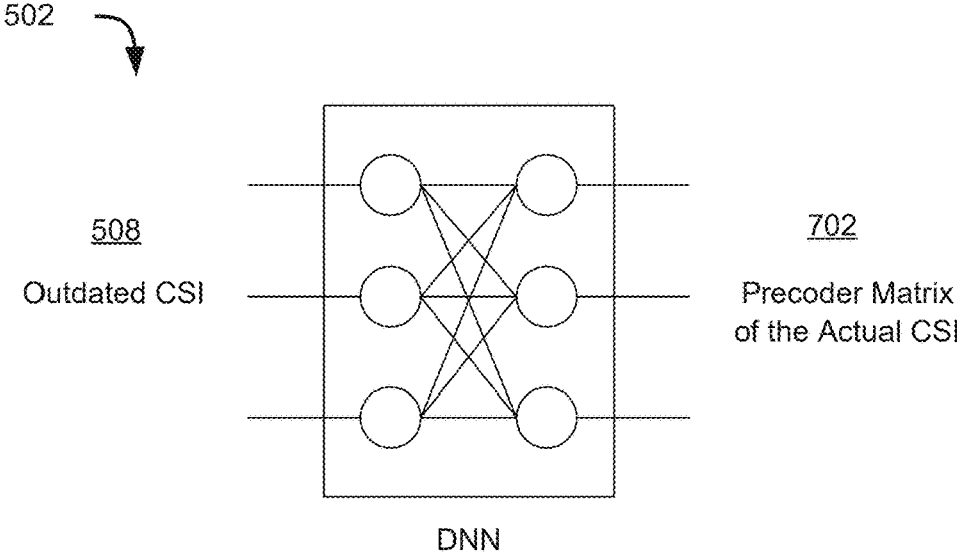

508
Outdated CSI

702
Precoder Matrix
of the Actual CSI

DNN

FIG. 7

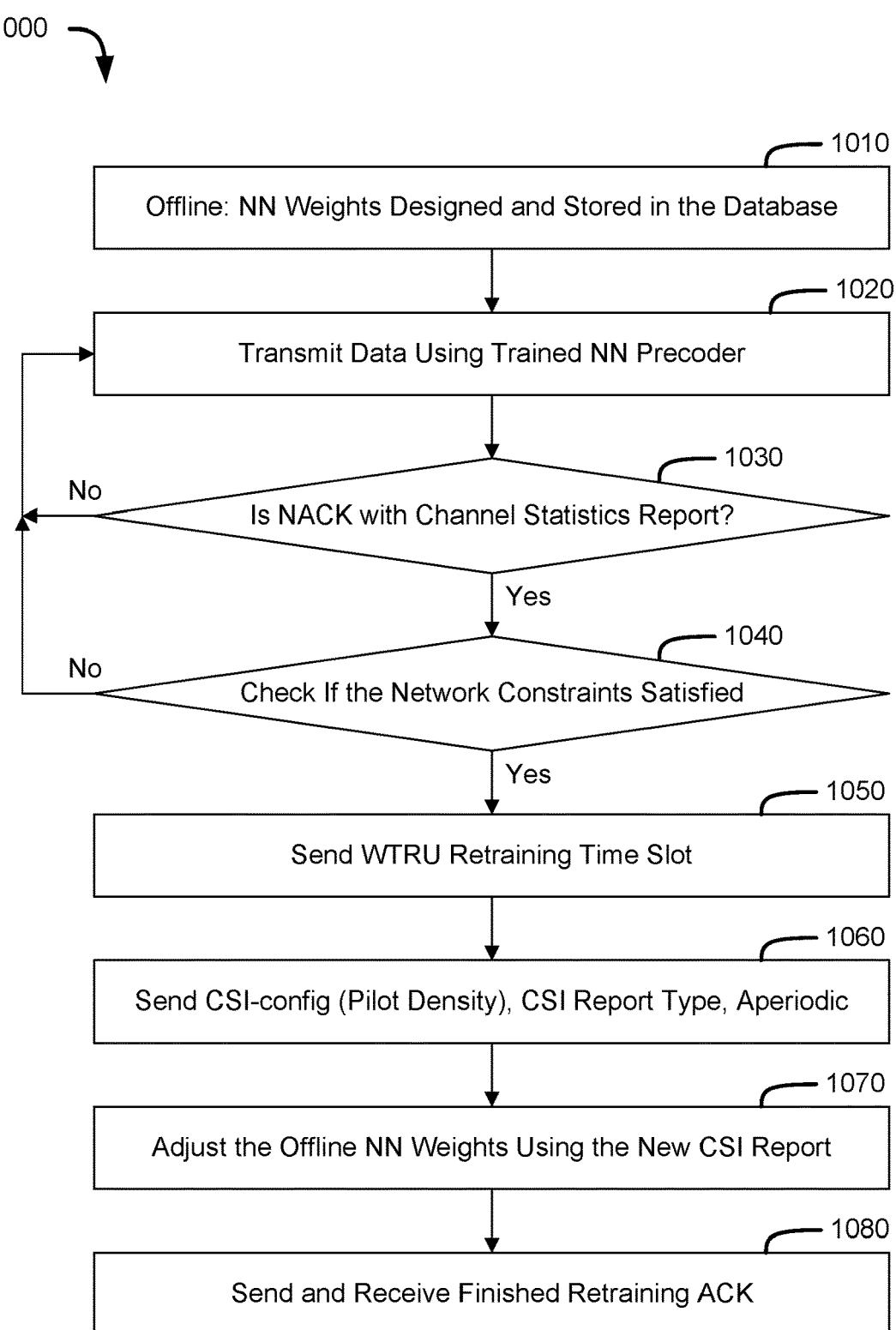

1000

1010
Offline: NN Weights Designed and Stored in the Database

1020
Transmit Data Using Trained NN Precoder

1030
Is NACK with Channel Statistics Report?

No

Yes

1040
Check If the Network Constraints Satisfied

No

Yes

1050
Send WTRU Retraining Time Slot

1060
Send CSI-config (Pilot Density), CSI Report Type, Aperiodic

1070
Adjust the Offline NN Weights Using the New CSI Report

1080
Send and Receive Finished Retraining ACK

1210 — Transmit Data Using PMI based Precoder

1220 — Is NACK Report Received?

No

Yes

1230 — Transmit Data Using AI-based Precoder

Figure 13:
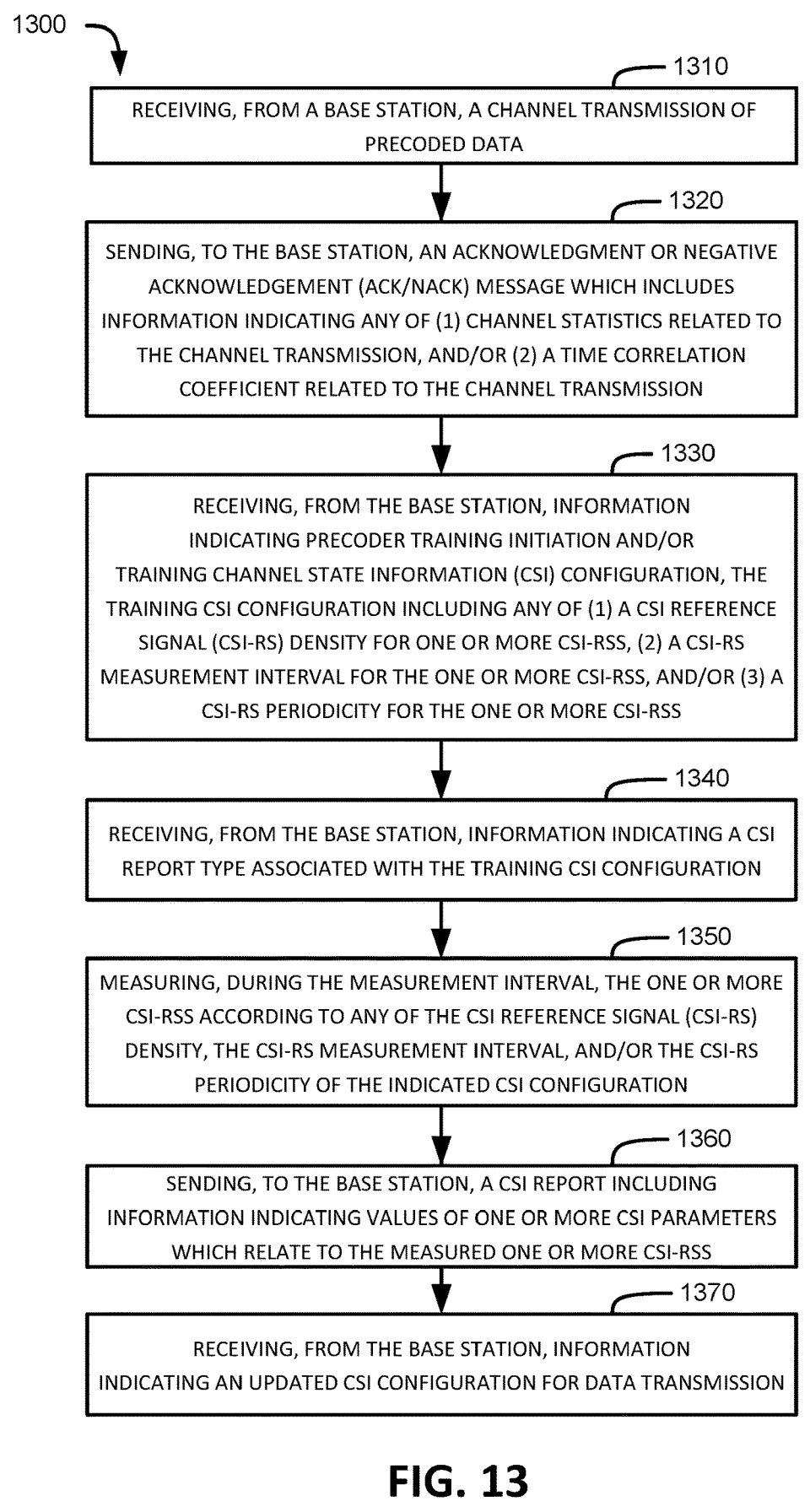

RECEIVING, FROM A BASE STATION, A CHANNEL TRANSMISSION OF PRECODED DATA

1320

SENDING, TO THE BASE STATION, AN ACKNOWLEDGMENT OR NEGATIVE ACKNOWLEDGEMENT (ACK/NACK) MESSAGE WHICH INCLUDES INFORMATION INDICATING ANY OF (1) CHANNEL STATISTICS RELATED TO THE CHANNEL TRANSMISSION, AND/OR (2) A TIME CORRELATION COEFFICIENT RELATED TO THE CHANNEL TRANSMISSION

1330

RECEIVING, FROM THE BASE STATION, INFORMATION INDICATING PRECODER TRAINING INITIATION AND/OR TRAINING CHANNEL STATE INFORMATION (CSI) CONFIGURATION, THE TRAINING CSI CONFIGURATION INCLUDING ANY OF (1) A CSI REFERENCE SIGNAL (CSI-RS) DENSITY FOR ONE OR MORE CSI-RSS, (2) A CSI-RS MEASUREMENT INTERVAL FOR THE ONE OR MORE CSI-RSS, AND/OR (3) A CSI-RS PERIODICITY FOR THE ONE OR MORE CSI-RSS

1340

RECEIVING, FROM THE BASE STATION, INFORMATION INDICATING A CSI REPORT TYPE ASSOCIATED WITH THE TRAINING CSI CONFIGURATION

1350

MEASURING, DURING THE MEASUREMENT INTERVAL, THE ONE OR MORE CSI-RSS ACCORDING TO ANY OF THE CSI REFERENCE SIGNAL (CSI-RS) DENSITY, THE CSI-RS MEASUREMENT INTERVAL, AND/OR THE CSI-RS PERIODICITY OF THE INDICATED CSI CONFIGURATION

1360

SENDING, TO THE BASE STATION, A CSI REPORT INCLUDING INFORMATION INDICATING VALUES OF ONE OR MORE CSI PARAMETERS WHICH RELATE TO THE MEASURED ONE OR MORE CSI-RSS

1370

RECEIVING, FROM THE BASE STATION, INFORMATION INDICATING AN UPDATED CSI CONFIGURATION FOR DATA TRANSMISSION

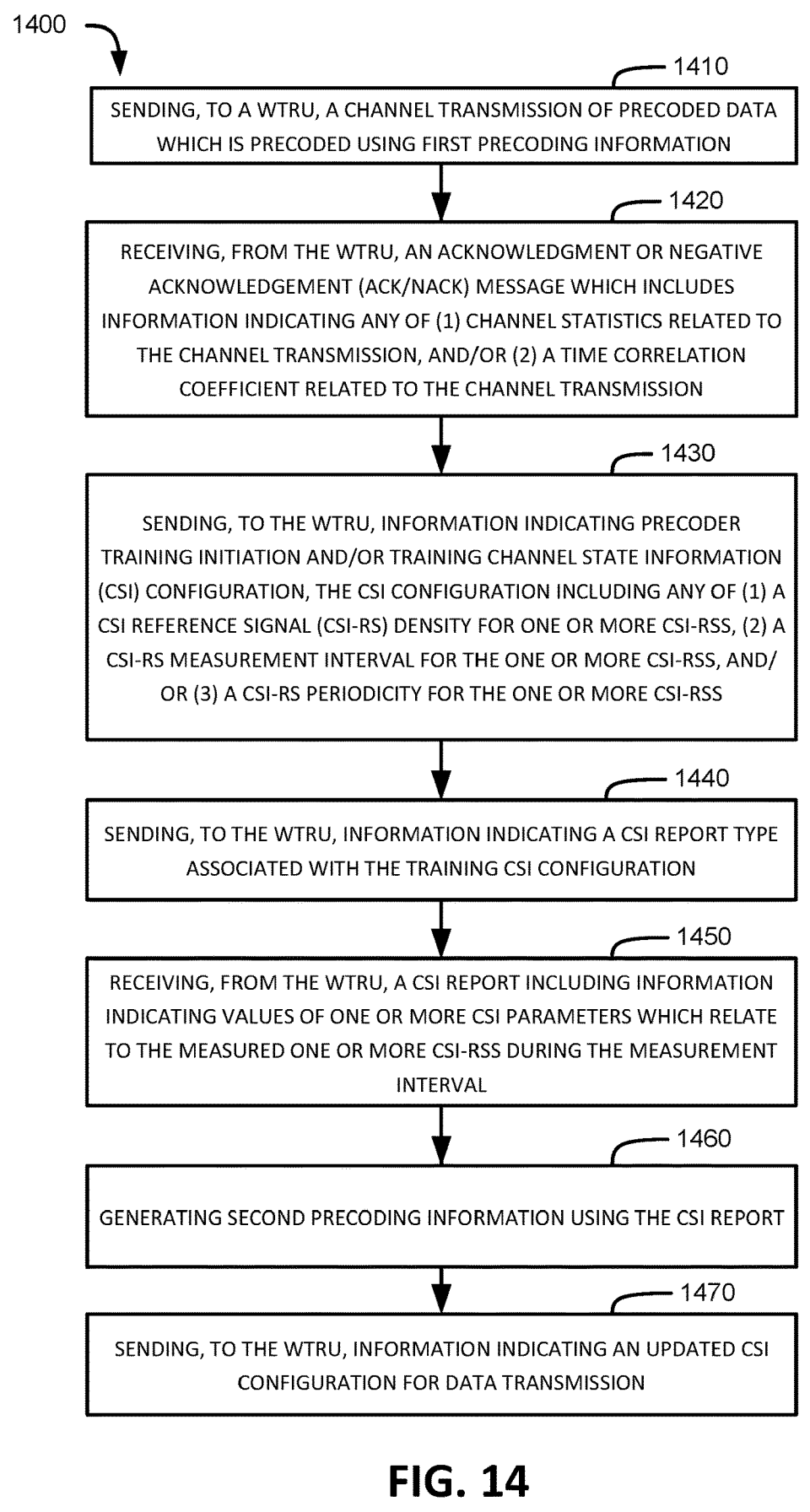

SENDING, TO A WTRU, A CHANNEL TRANSMISSION OF PRECODED DATA WHICH IS PRECODED USING FIRST PRECODING INFORMATION

1420

RECEIVING, FROM THE WTRU, AN ACKNOWLEDGMENT OR NEGATIVE ACKNOWLEDGEMENT (ACK/NACK) MESSAGE WHICH INCLUDES INFORMATION INDICATING ANY OF (1) CHANNEL STATISTICS RELATED TO THE CHANNEL TRANSMISSION, AND/OR (2) A TIME CORRELATION COEFFICIENT RELATED TO THE CHANNEL TRANSMISSION

1430

SENDING, TO THE WTRU, INFORMATION INDICATING PRECODER TRAINING INITIATION AND/OR TRAINING CHANNEL STATE INFORMATION (CSI) CONFIGURATION, THE CSI CONFIGURATION INCLUDING ANY OF (1) A CSI REFERENCE SIGNAL (CSI-RS) DENSITY FOR ONE OR MORE CSI-RSS, (2) A CSI-RS MEASUREMENT INTERVAL FOR THE ONE OR MORE CSI-RSS, AND/ OR (3) A CSI-RS PERIODICITY FOR THE ONE OR MORE CSI-RSS

1440

SENDING, TO THE WTRU, INFORMATION INDICATING A CSI REPORT TYPE ASSOCIATED WITH THE TRAINING CSI CONFIGURATION

1450

RECEIVING, FROM THE WTRU, A CSI REPORT INCLUDING INFORMATION INDICATING VALUES OF ONE OR MORE CSI PARAMETERS WHICH RELATE TO THE MEASURED ONE OR MORE CSI-RSS DURING THE MEASUREMENT INTERVAL

1460

GENERATING SECOND PRECODING INFORMATION USING THE CSI REPORT

1470

SENDING, TO THE WTRU, INFORMATION INDICATING AN UPDATED CSI CONFIGURATION FOR DATA TRANSMISSION

FIG. 14

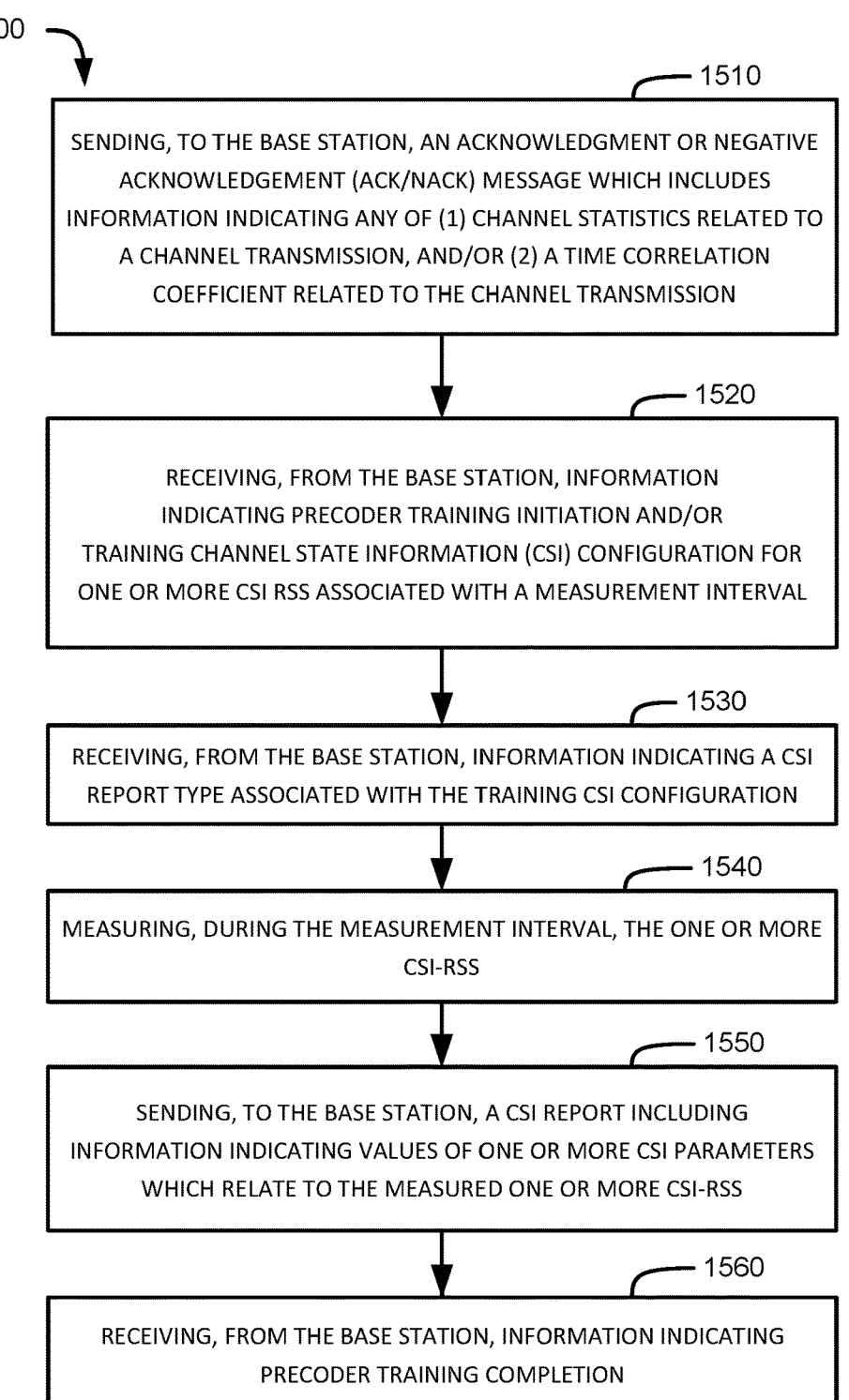

1500

1510

SENDING, TO THE BASE STATION, AN ACKNOWLEDGMENT OR NEGATIVE ACKNOWLEDGEMENT (ACK/NACK) MESSAGE WHICH INCLUDES INFORMATION INDICATING ANY OF (1) CHANNEL STATISTICS RELATED TO A CHANNEL TRANSMISSION, AND/OR (2) A TIME CORRELATION COEFFICIENT RELATED TO THE CHANNEL TRANSMISSION

1520

RECEIVING, FROM THE BASE STATION, INFORMATION INDICATING PRECODER TRAINING INITIATION AND/OR TRAINING CHANNEL STATE INFORMATION (CSI) CONFIGURATION FOR ONE OR MORE CSI RSS ASSOCIATED WITH A MEASUREMENT INTERVAL

1530

RECEIVING, FROM THE BASE STATION, INFORMATION INDICATING A CSI REPORT TYPE ASSOCIATED WITH THE TRAINING CSI CONFIGURATION

1540

MEASURING, DURING THE MEASUREMENT INTERVAL, THE ONE OR MORE CSI-RSS

1550

SENDING, TO THE BASE STATION, A CSI REPORT INCLUDING INFORMATION INDICATING VALUES OF ONE OR MORE CSI PARAMETERS WHICH RELATE TO THE MEASURED ONE OR MORE CSI-RSS

1560

RECEIVING, FROM THE BASE STATION, INFORMATION INDICATING PRECODER TRAINING COMPLETION

FIG. 15

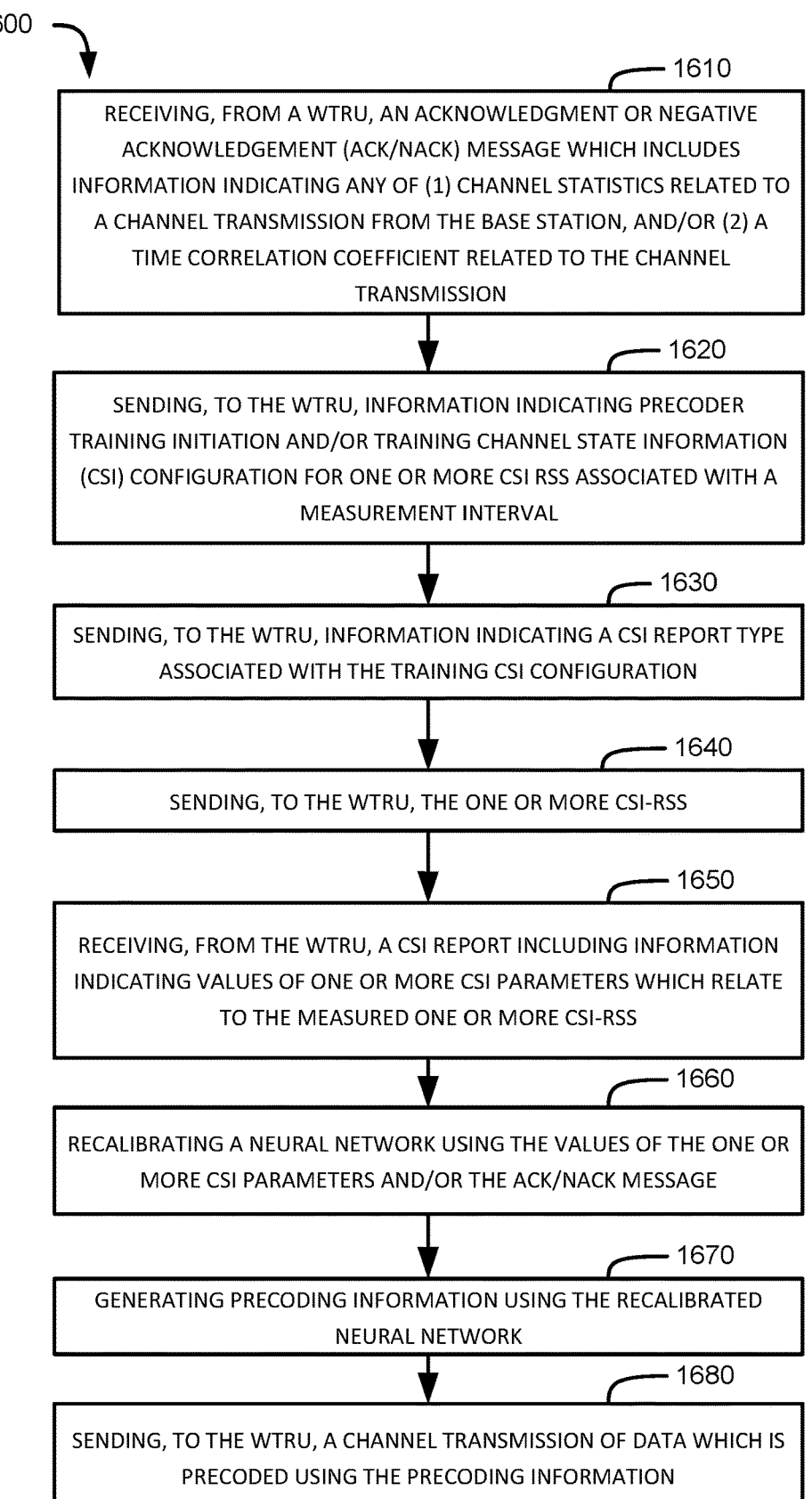

1600

1610

RECEIVING, FROM A WTRU, AN ACKNOWLEDGMENT OR NEGATIVE ACKNOWLEDGEMENT (ACK/NACK) MESSAGE WHICH INCLUDES INFORMATION INDICATING ANY OF (1) CHANNEL STATISTICS RELATED TO A CHANNEL TRANSMISSION FROM THE BASE STATION, AND/OR (2) A TIME CORRELATION COEFFICIENT RELATED TO THE CHANNEL TRANSMISSION

1620

SENDING, TO THE WTRU, INFORMATION INDICATING PRECODER TRAINING INITIATION AND/OR TRAINING CHANNEL STATE INFORMATION (CSI) CONFIGURATION FOR ONE OR MORE CSI RSS ASSOCIATED WITH A MEASUREMENT INTERVAL

1630

SENDING, TO THE WTRU, INFORMATION INDICATING A CSI REPORT TYPE ASSOCIATED WITH THE TRAINING CSI CONFIGURATION

1640

SENDING, TO THE WTRU, THE ONE OR MORE CSI-RSS

1650

RECEIVING, FROM THE WTRU, A CSI REPORT INCLUDING INFORMATION INDICATING VALUES OF ONE OR MORE CSI PARAMETERS WHICH RELATE TO THE MEASURED ONE OR MORE CSI-RSS

1660

RECALIBRATING A NEURAL NETWORK USING THE VALUES OF THE ONE OR MORE CSI PARAMETERS AND/OR THE ACK/NACK MESSAGE

1670

GENERATING PRECODING INFORMATION USING THE RECALIBRATED NEURAL NETWORK

1680

SENDING, TO THE WTRU, A CHANNEL TRANSMISSION OF DATA WHICH IS PRECODED USING THE PRECODING INFORMATION

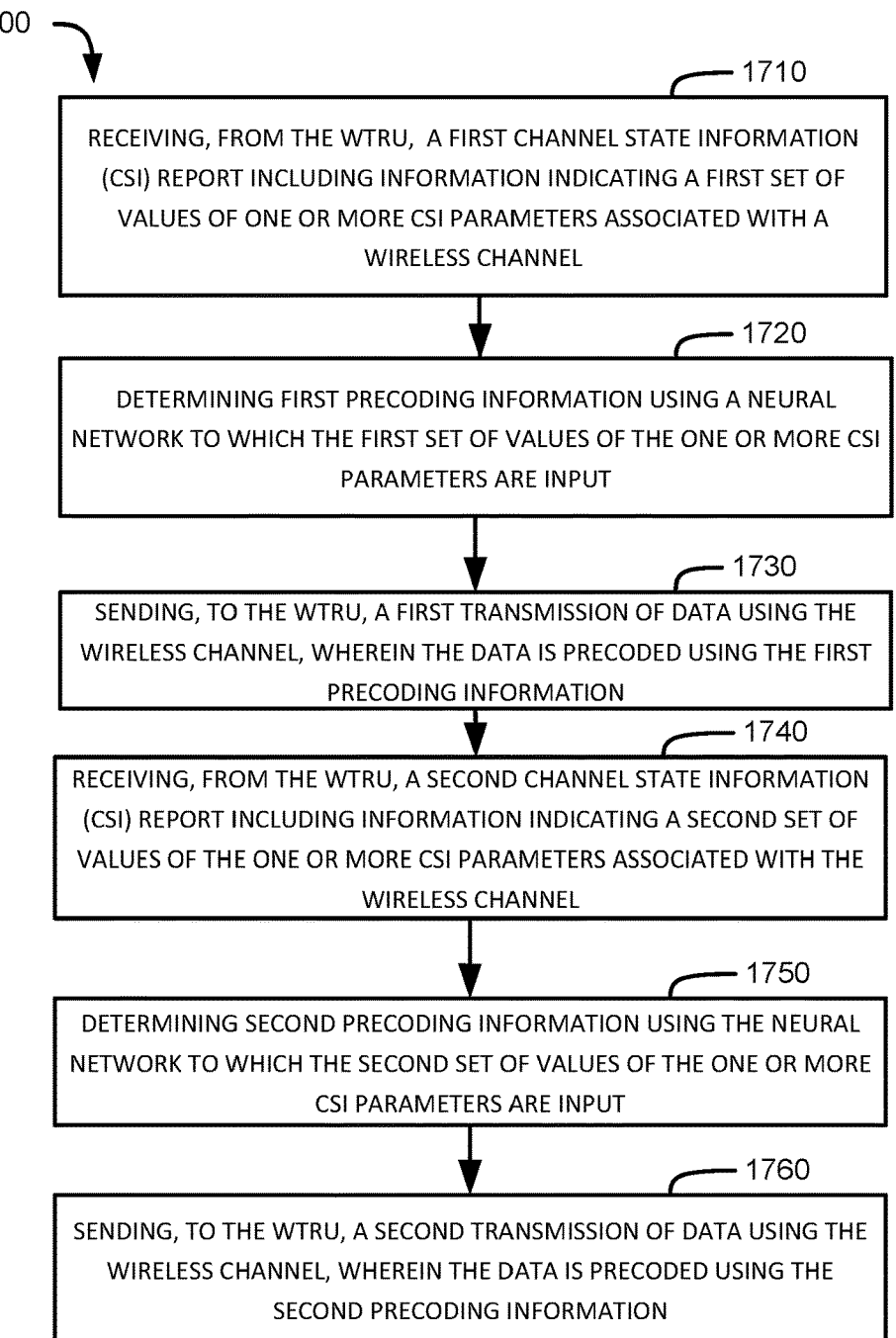

1710

RECEIVING, FROM THE WTRU, A FIRST CHANNEL STATE INFORMATION (CSI) REPORT INCLUDING INFORMATION INDICATING A FIRST SET OF VALUES OF ONE OR MORE CSI PARAMETERS ASSOCIATED WITH A WIRELESS CHANNEL

1720

DETERMINING FIRST PRECODING INFORMATION USING A NEURAL NETWORK TO WHICH THE FIRST SET OF VALUES OF THE ONE OR MORE CSI PARAMETERS ARE INPUT

1730

SENDING, TO THE WTRU, A FIRST TRANSMISSION OF DATA USING THE WIRELESS CHANNEL, WHEREIN THE DATA IS PRECODED USING THE FIRST PRECODING INFORMATION

1740

RECEIVING, FROM THE WTRU, A SECOND CHANNEL STATE INFORMATION (CSI) REPORT INCLUDING INFORMATION INDICATING A SECOND SET OF VALUES OF THE ONE OR MORE CSI PARAMETERS ASSOCIATED WITH THE WIRELESS CHANNEL

1750

DETERMINING SECOND PRECODING INFORMATION USING THE NEURAL NETWORK TO WHICH THE SECOND SET OF VALUES OF THE ONE OR MORE CSI PARAMETERS ARE INPUT

1760

SENDING, TO THE WTRU, A SECOND TRANSMISSION OF DATA USING THE WIRELESS CHANNEL, WHEREIN THE DATA IS PRECODED USING THE SECOND PRECODING INFORMATION

FIG. 17

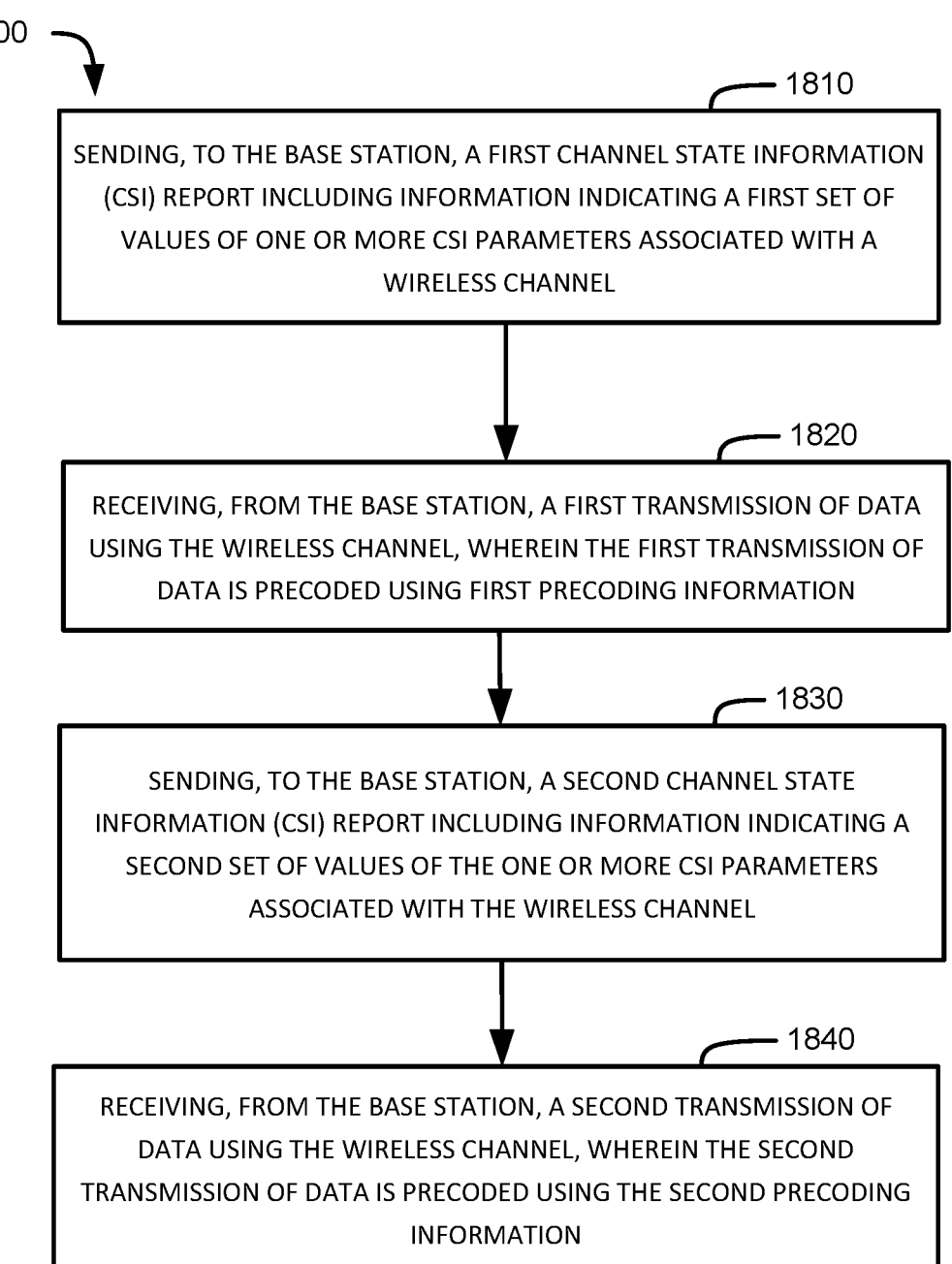

1800

1810

SENDING, TO THE BASE STATION, A FIRST CHANNEL STATE INFORMATION (CSI) REPORT INCLUDING INFORMATION INDICATING A FIRST SET OF VALUES OF ONE OR MORE CSI PARAMETERS ASSOCIATED WITH A WIRELESS CHANNEL

1820

RECEIVING, FROM THE BASE STATION, A FIRST TRANSMISSION OF DATA USING THE WIRELESS CHANNEL, WHEREIN THE FIRST TRANSMISSION OF DATA IS PRECODED USING FIRST PRECODING INFORMATION

1830

SENDING, TO THE BASE STATION, A SECOND CHANNEL STATE INFORMATION (CSI) REPORT INCLUDING INFORMATION INDICATING A SECOND SET OF VALUES OF THE ONE OR MORE CSI PARAMETERS ASSOCIATED WITH THE WIRELESS CHANNEL

1840

RECEIVING, FROM THE BASE STATION, A SECOND TRANSMISSION OF DATA USING THE WIRELESS CHANNEL, WHEREIN THE SECOND TRANSMISSION OF DATA IS PRECODED USING THE SECOND PRECODING INFORMATION

FIG. 18

METHODS, ARCHITECTURES, APPARATUSES AND SYSTEMS FOR ADAPTIVE LEARNING AIDED PRECODER FOR CHANNEL AGING IN MIMO SYSTEMS

CROSS-REFERENCE TO RELATED APPLICATIONS

This application is a U.S. National Stage Application under 35 U.S.C. § 371 of International Patent Application No. PCT/US2021/051659, filed 23 Sep. 2021, which claims the benefit of U.S. Provisional Application No. (i) 63/082, 620 filed 24 Sep. 2020 which is incorporated herein by reference.

BACKGROUND

The present disclosure is generally directed to the fields of communications, software and encoding, including, for example, to methods, architectures, apparatuses, systems directed to adaptive learning-aided precoding in wireless systems, such as multiple input-multiple output (MIMO) systems which include multi-user MIMO (MU-MIMO) and massive MIMO systems.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures (FIGs.) and the detailed description are not to be considered limiting, and other equally effective examples are possible and likely. Furthermore, like reference numerals ("ref.") in the FIGs. indicate like elements, and wherein:

FIG. 3 is a diagram illustrating a representative relationship between achievable data rate and antenna number for various different WTRU velocities;

FIG. 6 is a flowchart illustrating a representative procedure using adaptive precoding according to certain embodiments;

FIG. 7 is a diagram illustrating a representative deep neural network (DNN) arrangement according to certain embodiments;

FIG. 10 is a flowchart illustrating a representative procedure for a BS provided with a DNN according to certain embodiments;

FIG. 13 is a flowchart illustrating a representative procedure for configuring channel state information for adaptive precoder selection;

FIG. 14 is a flowchart illustrating a representative procedure for configuring channel state information for adaptive precoder selection;

FIG. 15 is a flowchart illustrating a representative procedure for adaptive precoder selection recalibration;

FIG. 16 is a flowchart illustrating a representative procedure for adaptive precoder selection recalibration;

FIG. 17 is a flowchart illustrating a representative procedure for adaptive precoder selection; and FIG. 18 is a flowchart illustrating a representative procedure for adaptive precoder selection.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
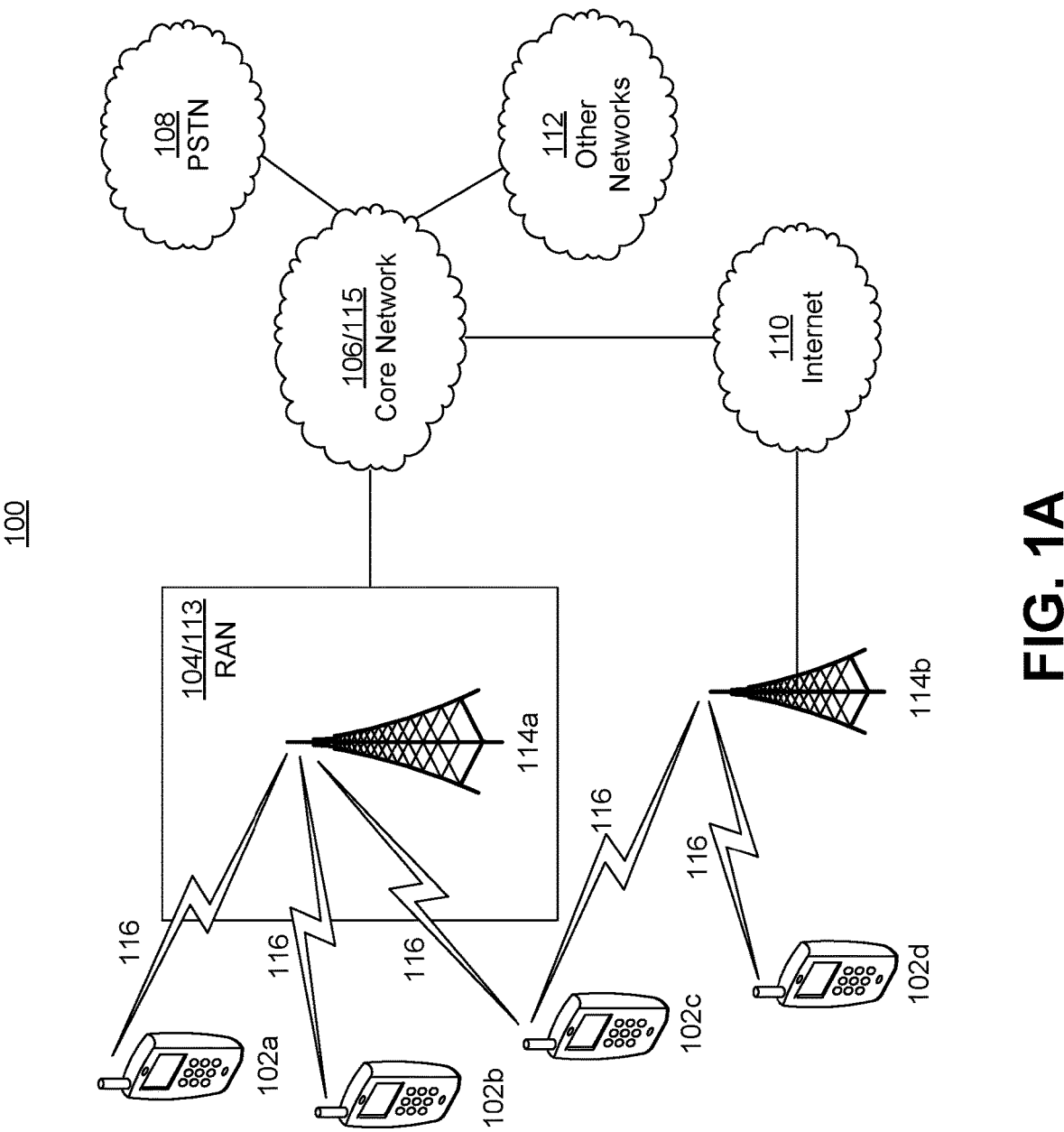
FIG. 1A is a system diagram illustrating an example communications system.

FIG. 1A is a system diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d, e.g., to facilitate access to one or more communication networks, such as the CN 106/115, the Internet 110, and/or the networks 112. By way of example, the base stations 114a, 114b may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in an embodiment, the base station 114a may include three transceivers, i.e., one for each sector of the cell. In an embodiment, the base station 114a may employ multiple-input multiple output (MIMO) technology and may utilize multiple transceivers for each or any sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In an embodiment, the base station 114a and the WTRUs 102a, 102b, 102c may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In an embodiment, the base station 114b and the WTRUs 102c, 102d may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/114 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
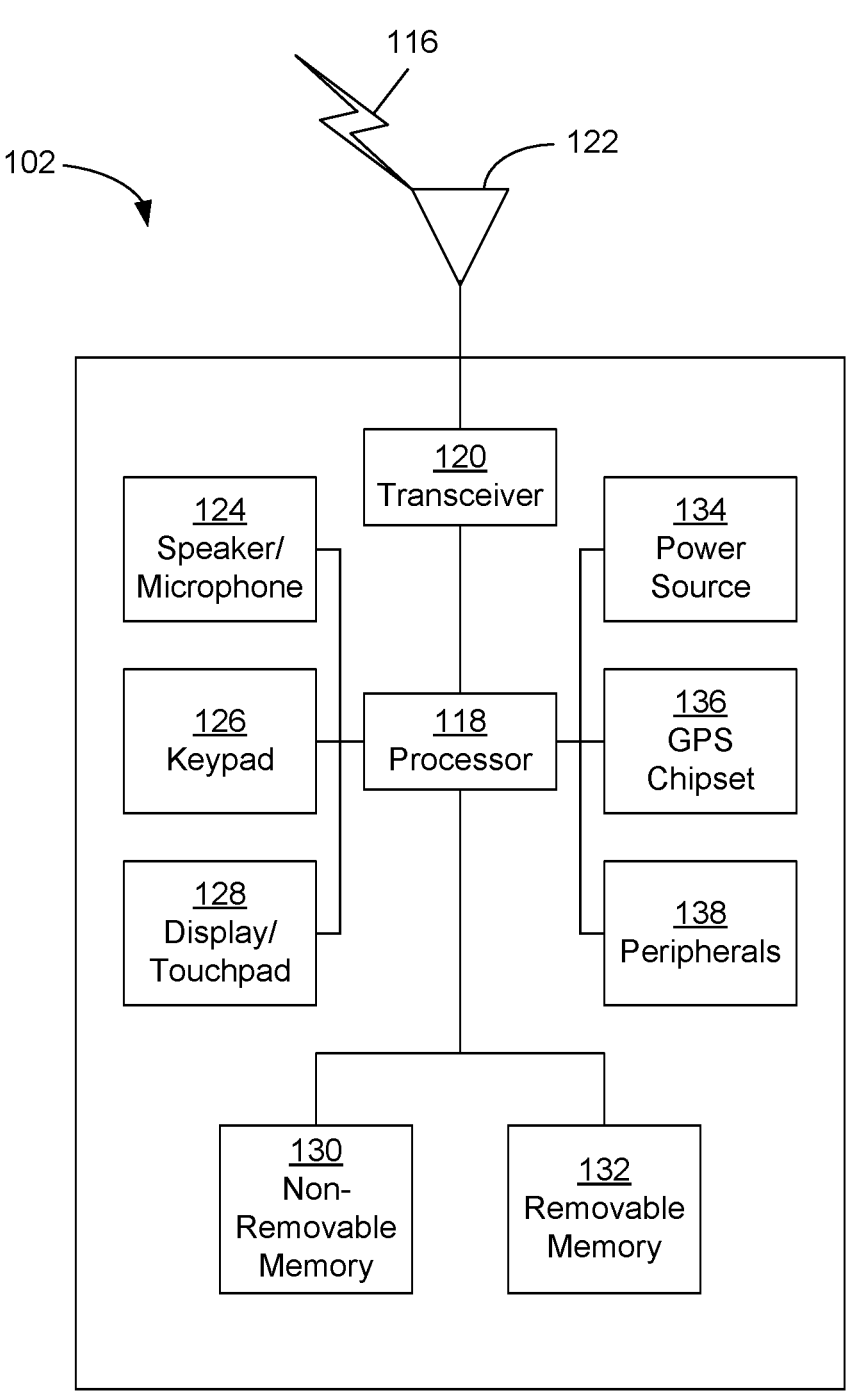
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other elements/peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. For example, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements/peripherals 138, which may include one or more software and/or hardware modules/units that provide additional features, functionality and/or wired or wireless connectivity. For example, the elements/peripherals 138 may include an accelerometer, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The elements/peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
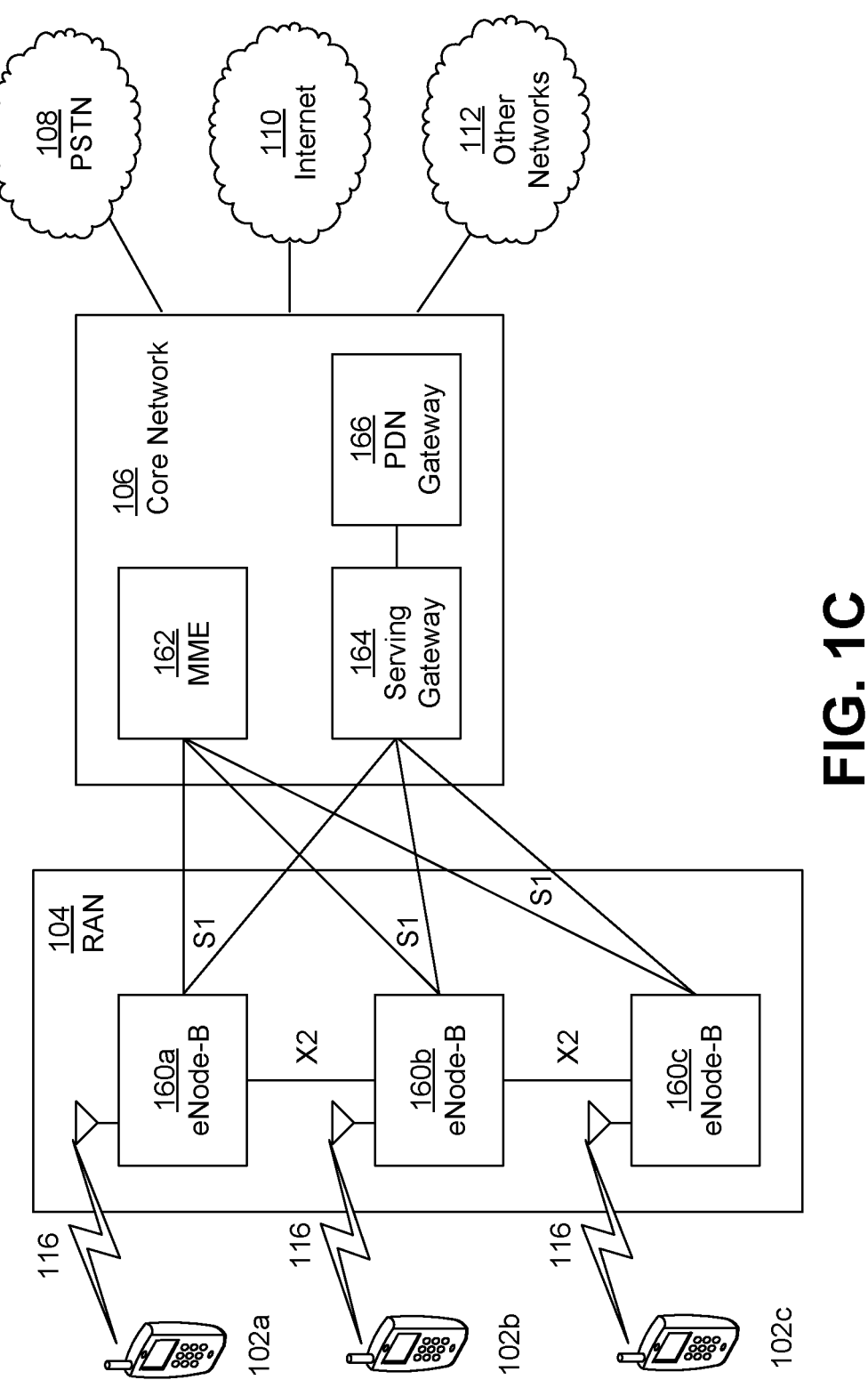
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102a, 102b, and 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink (UL) and/or downlink (DL), and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While each of the foregoing elements are depicted as part of the CN 106, it will be appreciated that any one of these elements may be owned and/or operated by an entity other than the CN operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode-Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode-B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in infrastructure basic service set (BSS) mode may have an access point (AP) for the BSS and one or more stations (STAs) associated with the AP. The AP may have an access or an interface to a distribution system (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier sense multiple access with collision avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High throughput (HT) STAs may use a 40 MHz wide channel for communication, for example, via a combination of the primary 20 MHz channel with an adjacent or nonadjacent 20 MHz channel to form a 40 MHz wide channel.

Very high throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse fast fourier transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to a medium access control (MAC) layer, entity, etc.

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV white space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support meter type control/machine-type communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or network allocation vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
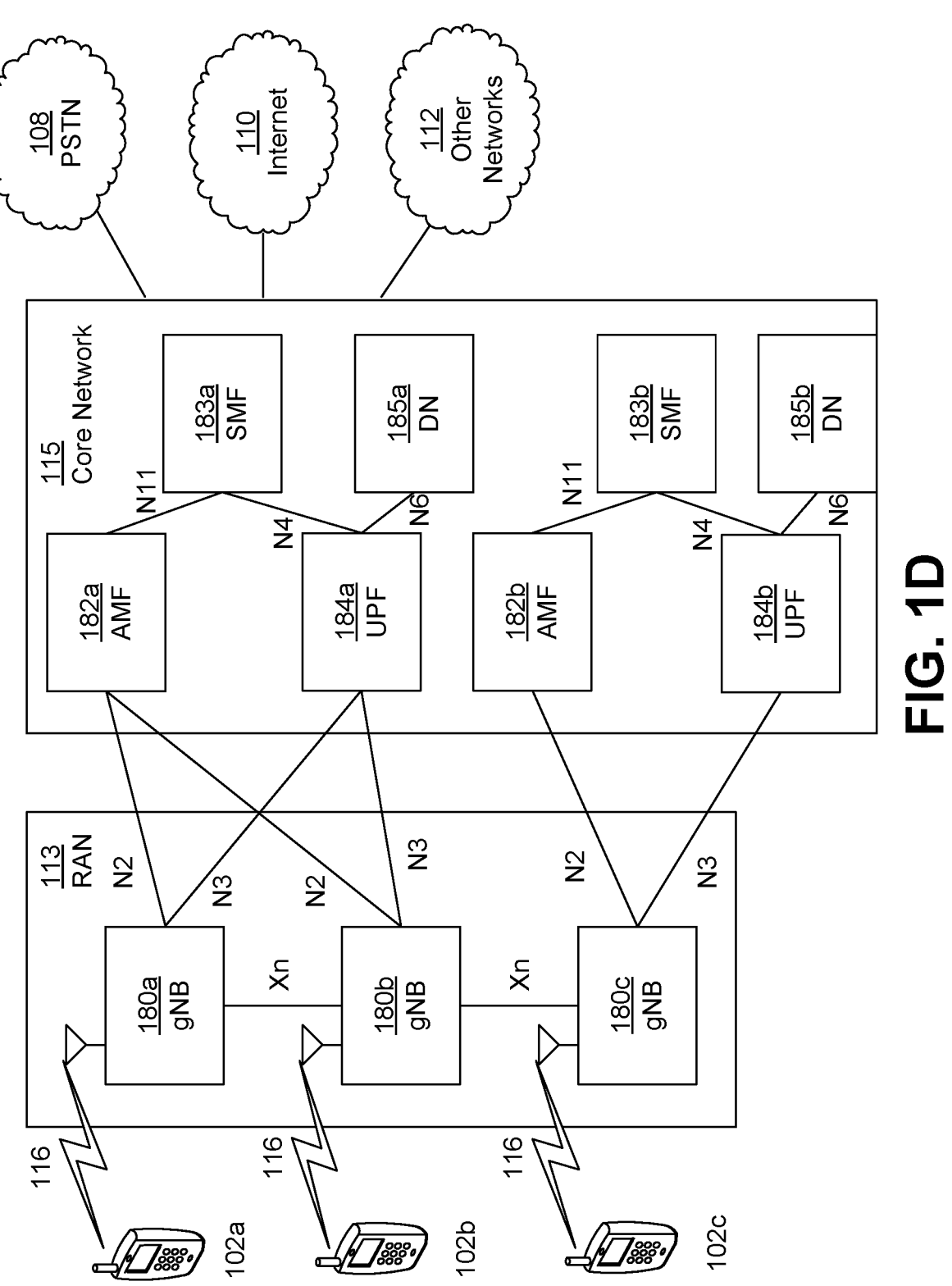
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In an embodiment, the gNBs 180a, 180b, 180c may implement MIMO technology. For example, gNBs 180a, 180b may utilize beamforming to transmit signals to and/or receive signals from the WTRUs 102a, 102b, 102c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., including a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In anon-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards user plane functions (UPFs) 184a, 184b, routing of control plane information towards access and mobility management functions (AMFs) 182a, 182b, and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one session management function (SMF) 183a, 183b, and at least one Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of NAS signaling, mobility management, and the like. Network slicing may be used by the AMF 182a, 182b, e.g., to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB)

access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, e.g., to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In an embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to any of: WTRUs 102a-d, base stations 114a-b, eNode-Bs 160a-c, MME 162, SGW 164, PGW 166, gNBs 180a-c, AMFs 182a-b, UPFs 184a-b, SMFs 183a-b, DNs 185a-b, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Although, a Network Access Point (NAP) is shown to be a base station (BS), an eNB and/or a gNB, among others, in FIGS. 1A to 1D, it should be understood other network access points (NAPs) are contemplated including 5G and beyond NAPs. For example, a NAP may include a distributed stack (e.g., set of layers) virtualized over any number of devices (e.g., hardware modules) which, in operation, may act as a NAP.

Introduction

In certain representative embodiments, a DNN (e.g., a DNN precoder) may be trained offline using information regarding a wireless channel (e.g., a state of the wireless channel). For example, the wireless channel may refer to a downlink wireless transmission. In some representative embodiments, the information regarding the wireless channel may take the form of CSI information, such as in cases where downlink transmission is performed by a gNB. The CSI information may include any of artificially generated CSI information and actual measured CSI information. The artificial CSI information may be generated using a given channel probabilistic distribution and channel time correlation coefficient. The measured CSI information may be obtained through one or more measurement campaigns in which one or more channels are actually measured and the measurements reported (e.g., historical measurement campaigns). After training of the DNN using any of the artificially generated CSI information and the actual measured CSI information, a precoder to be used for the channel (e.g., a downlink channel) may be selected using the trained DNN. CSI information of the channel may be fed back (e.g., as measured upon reception, such as at a UE) to the DNN to be used for retraining of the DNN to select weights (e.g., a weighting matrix) of the precoder.

In certain representative embodiments, a receiver may send a message to a transmitter (e.g., gNB or other NAP) to trigger retraining of a DNN. Upon retraining, the DNN may modify the precoder applied to by the transmitter. For example, the receiver (e.g., a UE) may be configured to detect an error event in a channel (e.g., a downlink channel). Upon condition that the error event is detected, the UE may send one or more indicators in order to trigger the transmitter (e.g., gNB or other NAP) to perform retraining of the DNN. For example, the indicators may be arranged in one or more messages (e.g., an uplink NACK message including any of CSI statistics, time correlation and/or bit error rate (BER)) in order to trigger the transmitter (e.g., gNB or other NAP) to perform retraining of the DNN.

In certain representative embodiments, a transmitter (e.g., gNB or other NAP) may configure one or more pilot sequences, such as reference signals (e.g., one or more CSI-RSs in the case of a gNB) in order to extract one or more training samples (e.g., CSI and/or beam pairs) to be used for updating and/or recalibrating the DNN weights of the precoder, and the configuration of the reference signals (e.g., CSI-RSs) may include any of transmission timing (e.g., one or more CSI-RS transmission time slots or mini-slots), periodicity (e.g., aperiodic), and a number of symbols (e.g., CSI-RS symbol density). The configuration of the pilot sequences signals may be based on channel state information which is fed back from the receiver (e.g., a UE). The channel state information or indicator(s) fed back to the DNN may include any of a channel time correlation indicator and a channel statistics indicator, and the channel state information or indicator(s) may determine a number of retraining samples to be used for updating and/or recalibrating the DNN weights of the precoder.

In certain representative embodiments, a transmitter (e.g., gNB or other NAP) may be configured to transmit one or more reference signals, such as CSI-RSs, and, after reference signal transmission, inform a receiver (e.g., a UE) to report one or more types of indicators (e.g., precoder-matrix indicator (PMI), channel quality indicator (CQI), rank indicator (RI), and/or a beam pair indicator) to be used in retraining of the DNN. In response, the receiver may report the types of information (e.g., CSI or indicator types) requested for the retraining.

In 3GPP NR, a precoding operation typically requires detailed knowledge of a state of a channel experienced by each device at a receiving side of the channel. The more extensive channel information regarding the state of the channel which is subjected to being fed back to a transmission side of the channel may allow selection of a downlink precoder that, ideally, not only focuses transmitted energy at one or more target devices but also limits interference to other devices scheduled in parallel on a same time and/or frequency resource(s). Higher spatial granularity due to PMI feedback generally comes at the cost of significantly higher signaling overhead.

In NR, precoder codebooks for downlink multiantenna precoding are only used in the context of PMI reporting (e.g., from a UE) and do not impose any restrictions on what precoder matrix is eventually selected by the network for downlink transmission to the reporting device. In other words, a network may select a precoder it opts for and the selected precoder by the network does not have to be part of any defined codebook.

In addition, it may be desirable to control the coherence of a frequency oscillator which determines the relative phase difference between respective signals transmitted on respective (e.g., two) antennas. Among multiple antennas, ensuring accurate coherence is needed in the case of general multi-antenna precoding where antenna-port-specific weight factors, including specific phase shifts, are applied to the respective signals transmitted on respective antenna ports. Without such coherence between the antenna ports, antenna-port-specific weight factors can pose a technical challenge as each antenna port may be likely to introduce a relative phase shift which may be more or less random.

Figure 2:
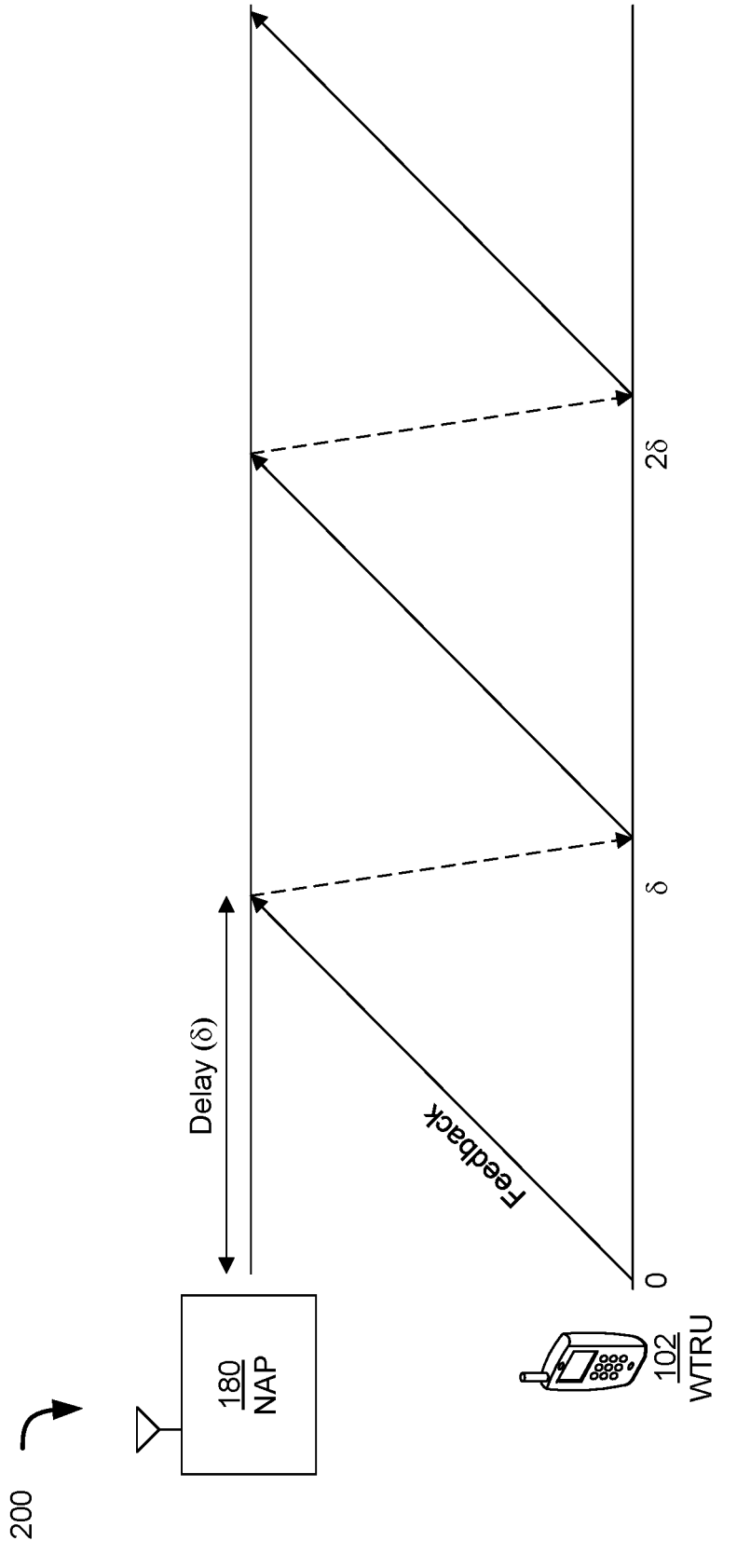
FIG. 2 is a timing diagram illustrating a representative example of feedback delay between a wireless transmit/receive unit (WTRU) and a base station (BS)

Furthermore, the time-varying nature of the channel poses further difficulties in design and/or selection of a precoder to be used for the channel. As a practical matter, a time delay exists between a time when channel estimation is performed at the receiver side (e.g., at a WTRU 102) and a time when the channel estimation is applied for composing a following downlink transmission. FIG. 2 is a timing diagram illustrating a representative example 200 of a feedback delay between a WTRU 102 and a NAP 180 (e.g., a gNB). As shown in FIG. 2, a WTRU 102 is assumed to perform channel estimation and report CSI as feedback (solid arrow in FIG. 2) to the NAP 180. At the NAP 180, the received feedback may be used to compose a later downlink transmission (dotted arrow in FIG. 2). A time delay "δ" represents the difference between the time when channel estimation is performed at the WTRU 102 and the time when the channel estimation is applied at the NAP 180.

More explicitly, due to time variations in the channel itself and delays in computation of the channel estimation parameters describing the state of the channel, the channel varies between when the state of the channel is learned at the WTRU 102 and when the state of the channel is available to be used for composing a transmission (e.g., beamforming) at the NAP 180. This phenomenon may be referred to herein as "channel aging." Factors which contribute to channel aging may include any of a Doppler shift amount, a CSI estimation processing time, and a degree of coherence, such as the absence thereof, among antennas. These factors may become more pronounced in beyond 5G networks such as massive MIMO systems. As the time duration of channel estimation processing scales linearly relative to the number of antennas, the delay time δ may be expected to increase relative to the number of antennas or the time taken for channel estimation processing. A consequence of the channel aging phenomenon is poor performance in terms of effective SNR and/or data rate.

FIG. 3 is a diagram illustrating a representative relationship between achievable data rate (bps/Hz) and antenna number (N) for various different WTRU velocities (km/h). By way of example only, 10 to 1000 antennas and velocities of 10 km/h to 250 km/h are considered in FIG. 3. Beyond 5G, it is be expected that the number of antennas may be on the order of a few hundred antennas. Such antennas may be deployed, in certain situations, in high Doppler systems such as, but not limited to, high-speed trains. The CSI processing time may be proportionate to the number of antennas. For networks and/or systems employing large and/or massive numbers of antennas, increased CSI processing time may cause the CSI estimated for the channel to become outdated.

As evident from FIG. 3, the achievable data rates at lower speeds (e.g., 10 km/h) has a general trend of increasing as the number of antennas increases. However, the achievable data rate suffers from degradation as the number of antennas increases due, at least in part, to higher speeds and increased channel estimation processing time(s). CSI estimation errors introduced at the receiver side may further erode communication performance and may cause further degradation to achievable data rates. Accordingly, care should be taken in designing and/or selecting the precoder to be used in order to address channel impairments such as channel aging.

As will be described herein, estimated CSI received at a transmission side (e.g., a NAP 180 in the case of a downlink channel) via feedback by a reception side (e.g., a WTRU 102 in the case of a downlink channel) is referred to as pertaining to or describing an "outdated channel." Further, as will be described herein, CSI present at the transmission side (e.g., a NAP 180 in the case of a downlink channel) at and/or during a transmission time is referred to as pertaining to and/or describing an "actual channel."

Figure 4:
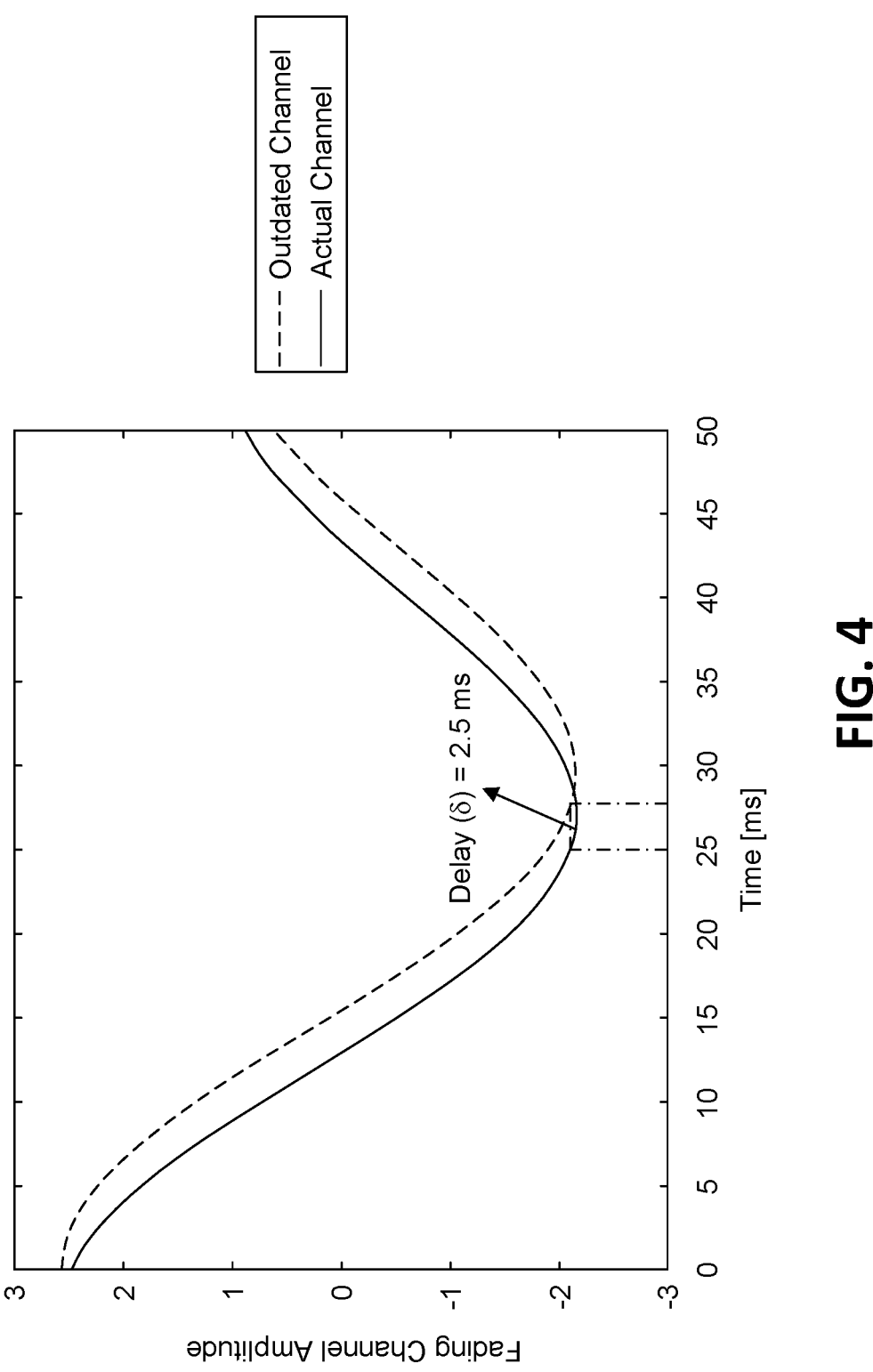
FIG. 4 is a diagram illustrating a representative example of channel aging with respect to an actual channel and an outdated channel over time.

FIG. 4 is a diagram illustrating a representative example of channel aging with respect to an actual channel and an outdated channel over time for a massive MIMO system. The outdated channel (e.g., outdated CSI) corresponds to CSI obtained at the transmission side (e.g., a NAP 180) via feedback from the reception side (e.g., a WTRU 102), while the actual channel is the channel present at the NAP 180 during the transmission In the example shown in FIG. 4, the outdated channel has a delay (δ) of 2.5 ms with respect to the actual channel.

In FIG. 4, a state or condition of the actual channel (e.g., the real-time physical channel) changes or evolves with time depending on the Doppler frequency using, for example, Jakes' model for Rayleigh fading. In FIG. 4, the outdated channel corresponds to the channel (e.g., CSI) received at the transmitter (e.g., a NAP 180 in the case of a downlink channel) via feedback by the receiver (e.g., WTRU 102 in the case of a downlink channel) after estimation at the reception side. An outdated channel may correspond to a shifted version of the actual channel having been shifted in time by a delay, such as 2.5 ms as in FIG. 4.

In certain representative embodiments, a NAP 180, upon acquiring the channel state information (e.g., any of PMI. CQI, and/or RI) from a WTRU 102, may select a precoder, such as one that best fits the channel conditions, is selected from the codebook. Ideally, the precoder selection should be based on the actual CSI (e.g., channel conditions of the actual channel experienced by the NAP 180 at the time of transmission). However, in practice and especially in the case of massive MIMO systems, acquiring the actual CSI may not be practical or feasible owing to the training duration involved for CSI estimation, which may cause delay in the feedback and other factors described above. In general, the minimum training duration scales linearly with the number of transmit antennas. This may cause a mismatch between the CSI during the training and the actual CSI at the NAP 180, as shown in FIGS. 2 and 4. In some circumstances, the mismatch may cause the precoder selection to not map to the CSI of the actual channel. This may cause degradation in the performance in terms of bit rate and/or bit error ratio (BER). The corresponding performance degradation is particularly evident in massive MIMO systems such as those with numbers of antennas as in FIG. 3.

The variation over time (e.g., evolution) of a real-time channel H(t) may be represented with an autoregressive (AR) model given by Equation (1) below:

$$H(t)=\rho H(t-1)+\sqrt{((1-\rho^2))}E(t) \tag{1}$$

where H(t) is the channel at time interval t, ρ is a time correlation coefficient, and E(t) is a Gaussian noise function. Moreover, Doppler shift, which contributes to the channel aging, is captured in the time correlation coefficient given by Equation (2) below:

$$\rho=J_0(2\pi f_d T_s) \tag{2}$$

where $J_0$ is a Bessel function (e.g., of the first kind of order zero), $f_d T_s$ is a normalized Doppler spread amount, with $f_d$ being Doppler spread and $T_s$ being sampling time. Additionally, CSI estimation errors and pilot contamination may further erode the quality-of-service (QoS).

In massive MIMO systems, it is contemplated that the air interface may operate at or in one or more portions of the mmWave spectrum. In this spectrum, large array gains may more than compensate for any path loss experienced at mm Wave frequencies. Additionally, by using precoding technologies with massive antenna arrays, multiple symbols can be transmitted, while reducing potential inter-antenna interference at the receiver. Moreover, through precoding techniques, multiple symbol streams can be concurrently served in the same time/frequency resource (MU-MIMO) using a spatial multiplexing mode, which improves the system spectral efficiency significantly.

A NAP 180 (e.g., gNB or other NAP 180), upon acquiring estimated channel station information (e.g., any of PMI, CQI, and/or RI) from the receiver, may be configured to select a precoder that best fits the estimated channel conditions, such as a precoder from a codebook. Ideally, precoder selection would be based on actual channel conditions corresponding to the channel as experienced by the NAP 180 at the time of transmission. However, and particularly in the case of massive MIMO systems, acquiring the actual CSI will not be practical owing to the length of time, or training duration, involved for CSI estimation, which causes the aforementioned time delay in the feedback of the estimated CSI, and/or the other factors described above. This is because the CSI estimation duration scales linearly with the number of transmit antennas. A mismatch between the estimated CSI at the WTRU 102, which corresponds to the outdated channel, and the actual CSI at the NAP 180, which corresponds to the actual channel, poses a problem. Due to such mismatching, precoder selection using the estimated CSI of the outdated channel may not accurately map to a precoder which would be selected when using CSI representative of the actual channel. This may cause degradation in performance in terms of both data rate and bit error ratio (BER). The performance degradation is particularly evident in massive MIMO due to the greater number of antennas, as may be seen in FIG. 3. Presently, there is a need for precoder selection which may address and/or compensate for channel aging.

Overview

In certain representative embodiments, a NAP 180 may be equipped with an artificial intelligence (AI) capability with which to combat the channel aging phenomenon such as by spatially multiplexing one or more symbol streams using an AI-enabled precoder. In certain representative embodiments, to reduce computational costs involved in the AI based precoder, an adaptive precoder scheme is further proposed, where adaptation is carried out between precoder selection using one or more predetermined codebooks and an AI-enhanced precoder which are described in greater detail below.

AI-Enhanced Precoder

In certain representative embodiments, wireless communication may involve at least one NAP 180 and at least one WTRU 102 performing communication over an air interface. The NAP 180 may include, or may otherwise be coupled to, an AI-based precoder. The WTRU 102 may be configured to feedback CSI at one or more timings to the NAP 180. In certain embodiments, the feedback may be provided as one or more indicators. In some embodiments, the indicator feedback may be in the form of physical layer signaling, such as uplink reference signals. The CSI may become inaccurate due to the channel aging phenomenon. The NAP 180 may utilize the outdated CSI in order to obtain a selected precoder for the actual channel which is appropriate for a current instant. A neural network (NN) may be configured to model a mapping between the received CSI representative of the outdated channel and the actual channel. By this mapping, the outdated CSI can be used to predict the actual CSI and therefore select a precoder appropriate for the actual channel. Thus, the channel aging phenomenon can be compensated for by selection of an appropriate precoder for the actual channel. To employ such a NN in real time, the NN may be trained offline to compute the weights of layers of the NN, where the input to the NN may be the outdated channel CSI and the output may be a precoder matrix.

In certain representative embodiments, the NN may be a deep neural network (DNN) (e.g., two or more hidden layers), corresponding to a particular number of transmit antennas and mobility (e.g., velocity), and may be trained offline at the NAP 180 using a model representative of channel aging. As used herein, DNN and NN may be used interchangeably. As mentioned above, the model may be an autoregressive (AR) model. The DNN data set (e.g., training data) may include CSI information may include any of artificially generated CSI information and/or actual measured CSI information as input to the DNN. The DNN data set (e.g., training data) may include a precoder matrix which corresponds to a state of the actual channel as output, and the precoder matrix may be an optimized or ideal precoder matrix having a plurality of weights generated by the DNN. In other representative embodiments, the DNN data set (e.g., training data) may include a number of transmit antennas and a mobility as further inputs for training.

After training, the NAP 180 may be configured with the trained DNN to perform precoder selection in real time using feedback from the WTRU 102. Depending on the WTRU 102 feedback (e.g., NACK, BER report, channel time correlation and/or channel statistics information) and/or network requirements, the NAP 180 may be caused to perform retraining of the DNN weights. In other words, the WTRU 102 feedback to the NAP 180 may cause recalibration of weights of the trained DNN. For example, the retraining of the NAP 180 may be triggered when any of the channel time correlation (e.g., p) and/or the channel statistics information and/or the BER are respectively indicated to exceed a threshold value. As another example, such threshold comparison may be performed when any of the channel time correlation (e.g., p) and/or the channel statistics information and/or the BER are received in a NACK message.

Retraining of the DNN may take one or more CSI samples as input(s). For example, one or more CSI samples may be generated by the WTRU 102 and fed back to the NAP 180. A number of the samples which may be used as input to retrain the DNN may be determined by the NAP 180 using one or parameters (e.g., channel time correlation and/or channel statistics information) which are fed-back by the WTRU 102. As another example, the number of the samples which may be used as input to retrain the DNN may be determined according to a loss function, such as a mean square error, such as at the NAP 180.

The NAP 180 may, for example, configure at least one pilot sequence for channel estimation (e.g., one or more CSI-RS) to extract the retraining samples (e.g., CSI and/or beam pairs). Configuring the CSI-RS may include setting any of a CSI-RS transmission timing (e.g., time slots), a periodicity and/or a number of CSI-RS symbols (e.g., CSI-RS density), and may be based on the received CSI feedback such as the channel time correlation and/or channel statistics information) and/or the number of retraining samples for recalibrating the DNN weights of the precoder.

After the CSI-RS transmission, the NAP 180 may be configured to inform and/or request the WTRU 102 to report the number of the retraining samples and/or the one or more types of CSI (e.g., any of PMI, RI, and/or beam-pairs) that are to be used as input(s) by the DNN to perform recalibration of the weights.

After being informed and/or requested to report by the NAP 180, the WTRU 102 may acknowledge the NAP 180 and may proceed to perform one or more estimates of the one or more requested types of CSI with the configured CSI-RS for retraining. For example, the WTRU 102 may provide the estimated CSI (e.g., the requested number of retraining samples) as one or more CSI reports to the NAP 180. After receiving the one or more reports from the WTRU 102, the NAP 180 may proceed to use the retraining samples (e.g., the estimated CSI) to retrain and/or recalibrate the weights of the nodes of the DNN.

Figure 5:
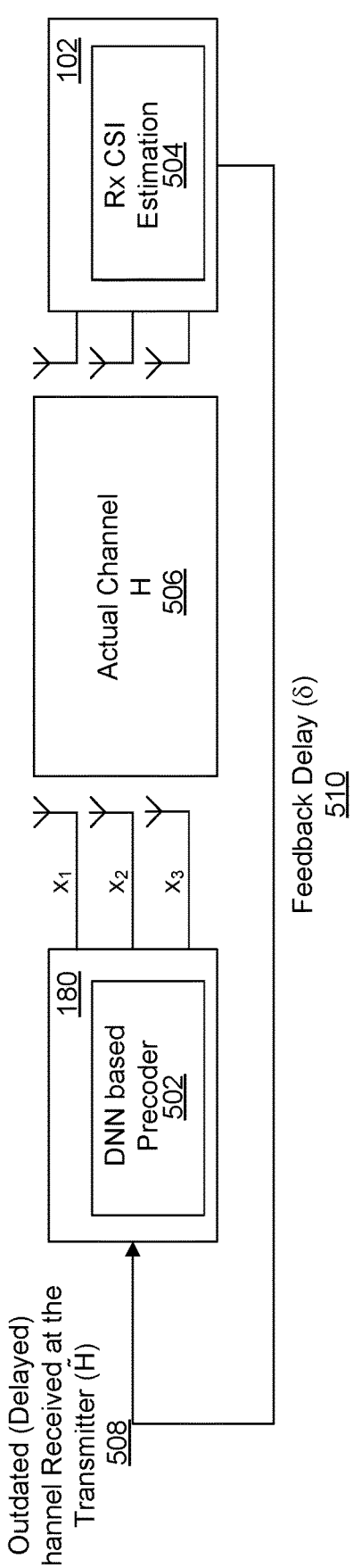
FIG. 5 is a diagram illustrating a representative multiple input-multiple output (MIMO) system and channel according to certain embodiments.

FIG. 5 is a diagram illustrating a representative MIMO system 500 and channel according to certain representative embodiments. As shown in FIG. 5, a DNN-based precoder 502 outputs, at the transmission side (e.g., a NAP 180), a plurality of signals (e.g., x1, x2, x3, etc.) to a plurality of antennas for transmission. The transmitted signals experience the actual channel H 506 and are received by a plurality of antennas the reception side (e.g., a WTRU 102). The WTRU 102 performs CSI estimation 504 on the received signals. The estimated CSI 508 may be fed back (e.g., reported) to the NAP 180. At the NAP 180, the estimated CSI of the actual channel H is received and may be considered as representative of the outdated channel $\tilde{H}$ due to the feedback delay δ 510.

The DNN 502 may take the estimated CSI which is representative of the outdated channel $\tilde{H}$ as input. Based on the input, the DNN 502 may select a precoder (e.g., weight matrix) that matches the actual channel H. For example, a precoder used to transmit signals over the outdated channel $\tilde{H}$ is adapted by the DNN to a selected precoder for the actual channel H using the outdated channel $\tilde{H}$ as input.

FIG. 6 is a flowchart illustrating a representative procedure 600 using adaptive precoding according to certain embodiments. As shown in FIG. 6, the procedure 600 may start with a training step in which training of the NN (e.g., a DNN 502) occurs at 610. The training at 610 (and/or later retraining at 640) may be performed offline and may use any of artificially generated CSI and/or previously measured (e.g., historical) CSI. For the training of the NN, the training set includes the outdated CSI and the precoder matrices of the actual CSI.

The training samples may include one or more samples which are generated artificially using channel statistics, such as a channel probability distribution, and/or machine learning techniques, such as Generative Adversarial Networks (GANs). Then, the artificially generated CSI is used to obtain corresponding outdated CSI using Equation (3) below:

$$H(t) = \rho \tilde{H}(t,\delta) + E, \tag{3}$$

or another model, that determines a relation between the actual CSI, outdated CSI, channel correlation, and time difference/delay between the actual and outdated CSI values.

The training samples may include one or more samples which may be based on CSI data obtained during prior (e.g., historical) measurement campaigns in the system, and stored in memory. This CSI data may then be used to obtain the corresponding outdated CSI using Equation (3) above. This approach may also be used to obtain the time correlation and/or the time delay of the CSI.

In Equation (3) above, H is the actual CSI which may be artificially obtained and/or obtained by measurement, and H is the outdated CSI, which can be obtained based on a time correlation coefficient, p. The outdated CSI may be used as input(s) to the DNN 620. A precoder matrix of the channel matrix H may be output from the DNN at 620. For example, the precoder of the actual CSI during the training phase, may be chosen as a right singular matrix of the channel matrix H, (e.g., V of $H = U\Sigma V^H$, while $E \sim CN(0, 1-\rho^2)$, t is the time. Here, δ is the time delay (e.g., measuring the channel aging) and ρ is the time correlation coefficient.

In certain embodiments, the values for the parameters δ and ρ may be used to trigger retraining such as for recalibrating and/or updating the DNN weights and/or may be provided as input parameters to the DNN at 640. The time correlation coefficient may be, for example, expressed as $\rho = J_0 (2\pi f_d T_s)$, where $f_d T_s$ is the normalized Doppler. The time correlation coefficient ρ may represent a degree of similarity between the CSI samples across time. The time correlation coefficient ρ may also be, for example, expressed as $\rho = E_H(H(\tilde{H})^H)$. This process may further continue to obtain a training set which may be represented as $\mathcal{T} = \{[\tilde{H}_1, V_1(H_1)][\tilde{H}_2, V_2(H_2)], \ldots, [\tilde{H}_N, V_N(H_N)]\}$. The training set $\mathcal{T}$ may then be used for training the DNN to determine weights of the nodes of the DNN by minimizing an error between a predicted precoder matrix and a true precoder matrix.

In offline training, artificially generating the CSI samples artificially using channel statistics may reduce pilot overhead as compared to conducting one or more actual measurement campaigns (e.g., actual measurement at the WTRU 102). However, in a hybrid option, the DNN weights may later be recalibrated at 640 using a few training samples in real time, which may be dependent on the time correlation coefficient fed back by the WTRU 102. As an example, the number of retraining/recalibration samples may be determined from a difference between a time correlation coefficient used to previously train the DNN and a newly received time correlation indicated by the WTRU 102.

Figure 9:
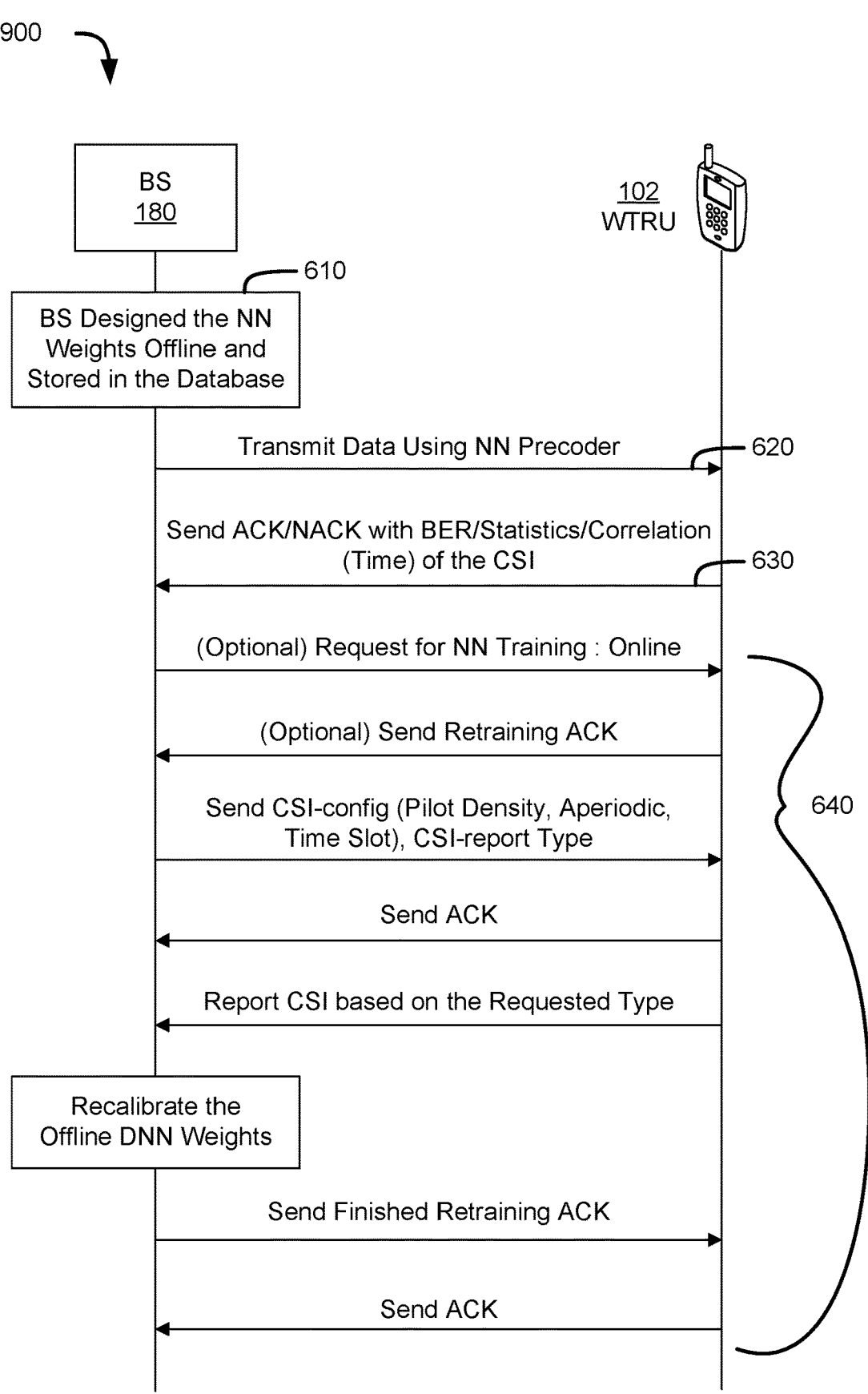
FIG. 9 is a diagram illustrating a representative communication procedure for retraining of a DNN according to certain embodiments.

FIG. 9 is a diagram illustrating a representative communication exchange using a trained DNN according to certain embodiments. As shown in FIG. 9, a trained DNN is stored, such as in a database, at the NAP 180. The NAP 180 may train the DNN offline in order to design (e.g., calibrate and/or train) the weights of the DNN as explained above.

After training, the procedure of FIG. 6 may proceed to use CSI feedback in an inference step at 620 to determine (e.g., select) a precoder matrix (e.g., V as described above) appropriate for the actual channel (e.g., H as described above). For example, selection of the precoder (e.g., V as described above) to used in a transmission, such as a downlink transmission at the current time, employs the trained DNN. FIG. 7 is a diagram illustrating a representative deep neural network (DNN) arrangement 502 according to certain embodiments. As shown in FIG. 7, the estimated CSI 508, which may fed back to the NAP 180 from the WTRU 102 and delayed by δ (e.g., outdated), is input to the DNN. An inference process using the outdated CSI 508 is performed by the trained DNN to output a precoder matrix 702 which corresponds to the actual channel and/or actual CSI of the channel. While FIG. 7 depicts a NN having an input stage, including a plurality of input nodes, connected to an output stage, having a plurality of output nodes, it should be appreciated that a DNN may further include one or more intermediate (e.g., hidden) stages/layers of nodes (not shown) connected between the input stage and the output stage. Training of the DNN may likewise include learning weights of the various interconnections of the nodes to reach a minimization as described above. At 620, WTRU data may be precoded using the selected precoder matrix 702 and transmitted from the NAP 180.

In certain representative embodiments, after a downlink transmission using the selected precoder at 620, the procedure of FIG. 6 may continue to a feedback step at 630. For example, the WTRU 102 may send an ACKNACK report to the NAP 180 in response to the downlink transmission as shown in FIG. 9. The ACK/NACK report may include any of BER, channel statistics, such as variance and/or mean of the channel, and/or time correlation of the channel. Depending on one or more transmission parameters which may be configured for the network or for the NAP 180, such as network spectral efficiency or other threshold comparison such as the time correlation coefficient, the NAP 180 may proceed to retrain the DNN. For example, a retraining of the DNN may be triggered by calculation of the time correlation coefficient (e.g., $\rho$) of the channel with respect to the WTRU 102 and/or the time delay (e.g., $\delta$). One or more of these parameters may be fed back to the NAP 180 from the WTRU 102.

Figure 8:
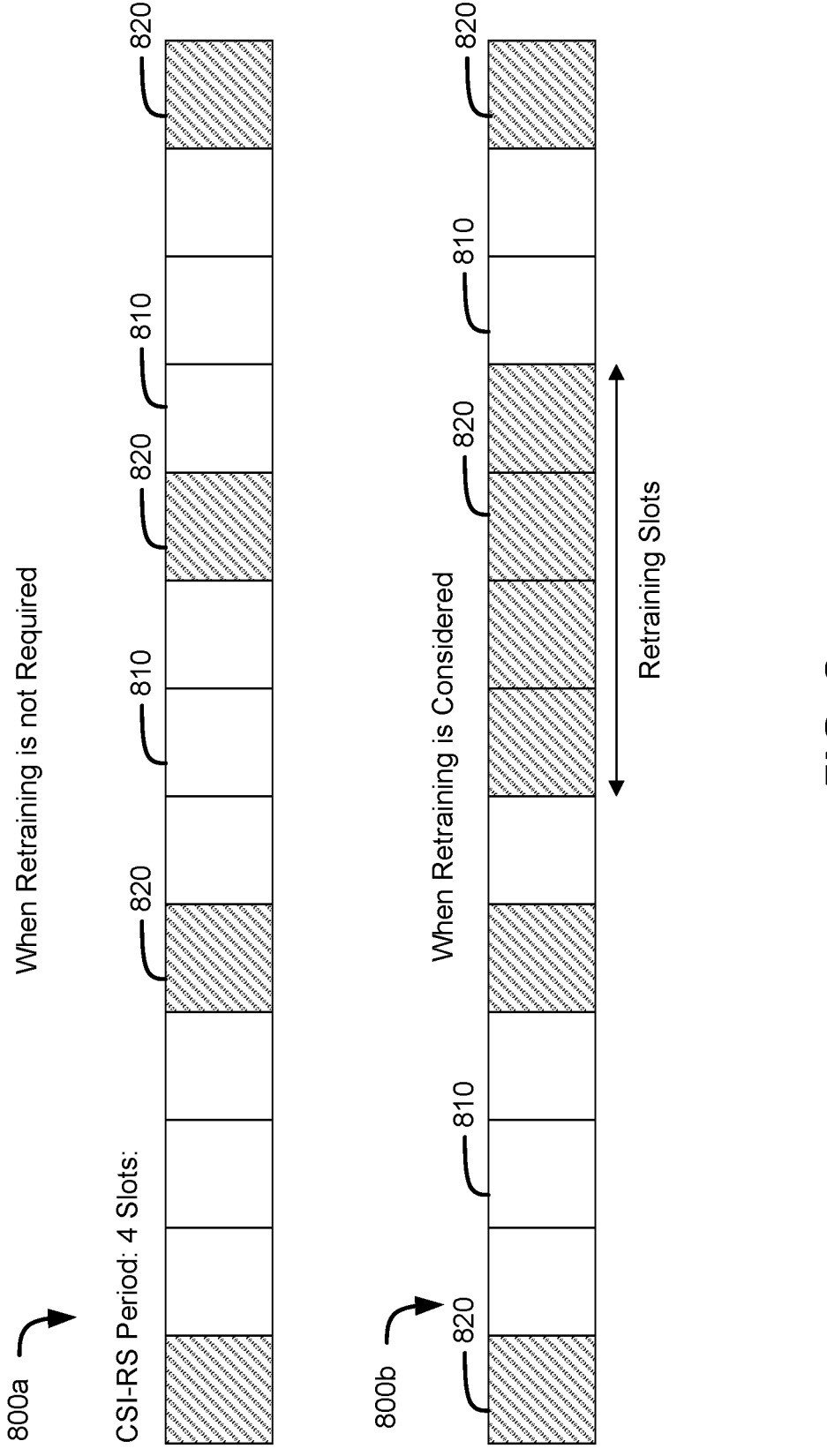
FIG. 8 is a diagram illustrating representative Channel State Information Reference Signal (CSI-RS) placement in slots for retraining of a DNN according to certain embodiments.

In certain representative embodiments, the NAP 180 may control transmission of the CSI-RS based on whether or not retraining is to be performed. FIG. 8 is a diagram illustrating representative Channel State Information Reference Signal (CSI-RS) placement in slots 810 for retraining of a DNN according to certain embodiments. When retraining is not required to be performed, the NAP 180 may configure the CSI-RS 820 to be transmitted with a first periodic timing and/or slot offset. For example, as shown in FIG. 8, the CSI-RS 820 may be transmitted every fourth slot as shown in the placement 800a in FIG. 8. When retraining is considered to be performed, the NAP 180 may configure the CSI-RS 820 to be transmitted at additional times (e.g., at a higher density) as compared to when retraining is not required to be performed as can be seen in the placement 800b in FIG. 8. The additional times may be determined based on the time correlation coefficient of the channel. The NAP 180 may inform the WTRU 102 of the information about the CSI-RS time slots and density.

Upon receiving the CSI-RS, the WTRU 102 may estimate the CSI of the channel. Such CSI samples may be used to determine the statistics and/or time correlation of the channel. As an example, the correlation information which is fed back to the NAP 180 may be a difference observed between a previous correlation amount and a current correlation amount. Feedback of the difference may reduce the overhead required for the feedback process.

In certain representative embodiments, the frequency of the feedback may depend on Doppler spread and/or BER requirements. For example, high mobility scenarios may require frequent feedback to the NAP 180. Lower mobility scenarios may not require feedback to be performed as frequently as higher mobility scenarios.

After receiving an ACKNACK report from the WTRU 102, the procedure of FIG. 6 may continue to a retraining step. In certain representative embodiments, upon condition that the NAP 180 determines to employ retraining, the NAP 180 may send a request to the WTRU 102 for NN training. The request may be an indicator to indicate that the training is to be performed online or may indicate that the training is to be performed offline. The WTRU 102 may send an acknowledgment of the request from the NAP 180 that retraining is to be performed as shown in FIG. 9.

Upon condition that the NAP 180 determines to employ retraining, the NAP 180 may send a CSI-RS configuration and/or a CSI reporting type, or may or may otherwise indicate the same to the WTRU 102, such as with the retraining request. For example, the CSI-RS configuration may include any of a type of reference signal, a density (e.g., pilot density), a periodicity, and/or a transmission timing (e.g., slot(s), mini-slot(s), and/or offsets) for extracting training (e.g., retraining) samples. The WTRU 102 may send an acknowledgment of the CSI-RS configuration and/or a CSI reporting type to the NAP 180 as shown in FIG. 9. The WTRU 102 may proceed to extract one or more training samples based on the transmitted CSI-RS. The training samples may include any of PMI, CQI, RI and/or beams (e.g., beam pairs). For example, the training samples may be extracted according to the CSI reporting type requested by the NAP 180. One or more of the extracted training samples may then be fed back (e.g., reported) to NAP 180 for retraining. The extracted training samples may be fed back along with retraining information such as a type of reference signal (e.g., NZP-CSI-RS, CSI-IM-Resource) and/or a type of CSI reporting (e.g., any of PMI, CQI, RI and/or beams) to be used for retraining as shown in FIG. 9.

The NAP 180 may configure the types of the resources such as periodicity (e.g., periodic, aperiodic, semipersistent) and pilot density depending on whether retraining is to be performed. For example, any of the time correlation coefficient, CSI statistics, and/or BER which are fed back from the WTRU 102 may be used to determine the types of the CSI-RS resources (e.g., periodicity and/or pilot density) for retraining the DNN weights. By way of example, in 5G NR, three types of pilot densities are defined: ½, 1, 3. Therefore, upon reception of the time correlation coefficient as well as CSI reporting by the NAP 180, a pilot density may be assigned depending on the number of training samples which may be needed to recalibrate the weights of the DNN and/or weights of the precoder. In certain embodiments, a relatively high correlation may be indicative that a lower CSI-RS density may be used for retraining and vice versa. For example, a number of training samples required for recalibrating the DNN weights may be determined by using a loss function, such as a minimum mean squared error, being greater than (or less than) a threshold of the DNN at the NAP 180.

Upon reception of the CSI-RS, the WTRU 102 may perform estimation of the CSI of the channel. For example, the WTRU 102 may send an acknowledgment regarding the configured CSI-RS for retraining and may feed back at least one CSI report that is configured (e.g., any of PMI, CQI, RI and/or beams). The NAP 180 upon receiving the CSI feedback (e.g., training samples), may provide the received CSI as input(s) to the for retraining the DNN in order to adjust the DNN weights. The retraining of the DNN may occur offline. After the retraining of the DNN has finished, the NAP 180 may send a finished retraining acknowledgment to the WTRU 102. For example, the WTRU 102 may respond with a further acknowledgement as shown in FIG. 9 before the NAP 180 may begin using the retrained DNN for downlink transmission(s).

FIG. 10 is a flowchart illustrating a representative procedure 1000 for a NAP 180 provided with a DNN according to certain embodiments. As shown in FIG. 10, a DNN may be trained (e.g., offline) to design weights of the DNN using artificially generated CSI which model a channel and/or historical measurements of CSI of a channel at 1010. After training, the NAP 180 may be provided with and/or store the DNN in a database at 1010. Upon being provided with the DNN, the NAP 180 may begin using the DNN to select a precoder matrix to be used to precode a transmission at 1020. For example, the NAP 180 may input CSI (e.g., information of a latest CSI report) which represents a channel to the DNN and may obtain a precoder matrix for the actual channel as an output from the DNN. Upon receiving the precoder matrix, the obtained precoder matrix may be applied to precode a next transmission on the channel. After transmission at 120, the NAP 180 may be configured to receive an ACK/NACK message at 1030 from a WTRU 102 which received the transmission to which the obtained precoder matrix was applied. Upon condition that a NACK message which includes any of time correlation coefficient and/or BER and/or channel statistics is not received, the NAP 180 may continue to apply the obtained precoder matrix to a next transmission on the channel and transmit the precoded transmission again at 1020. Alternatively, the NAP 180 may newly obtain another precoder matrix from the DNN using any CSI which may have been fed back from the WTRU 102 and apply the newly obtained precoder matrix to the next transmission on the channel and transmit the same over the channel at 1020.

Upon condition that a NACK message which includes any of the time correlation coefficient and/or BER and/or channel statistics is received at 1030 from a WTRU 102 which received the transmission to which the obtained precoder matrix was applied, the NAP 180 may check whether one or more network constraints regarding the channel are satisfied at 1040. For example, the NAP 180 may check any of the time correlation coefficient and/or BER and/or channel statistics against respective thresholds to determine whether any of the network constraints are not satisfied. Upon condition that the NAP 180 determines that the one or more network constraints are satisfied, the NAP 180 may continue to apply the obtained precoder matrix to a next transmission on the channel and transmit the precoded transmission at 1020. Alternatively, the NAP 180 may newly obtain another precoder matrix from the DNN using any CSI which may have been fed back from the WTRU 102 and apply the newly obtained precoder matrix to the next transmission on the channel and transmit the same over the channel at 1020.

Upon condition that the NAP 180 determines that the one or more network constraints are not satisfied at 1040, the NAP 180 may proceed to send the WTRU 102 a transmission timing (e.g., slot(s), mini-slot(s), and/or offsets) for extracting training (e.g., retraining) samples at 1050. The NAP 180 may also proceed to send at 1060 a CSI-RS configuration and a CSI reporting type which may trigger aperiodic reporting. The CSI-RS configuration may include any of a type of reference signal, a density (e.g., pilot density), and/or a periodicity. While FIG. 10 shows the transmission timing may be sent prior to sending the CSI-RS configuration and/or the CSI reporting type, the NAP 180 may also send any of the transmission timing, the CSI-RS configuration and/or the CSI reporting type together (e.g., one message or indication) or as separate messages or indications.

Upon condition that any of the transmission timing, the CSI-RS configuration and/or the CSI reporting type have been sent to the WTRU 102, the NAP 180 may receive at least one new corresponding CSI report from the WTRU 102 at 1060. After receiving the at least one new CSI report, the NAP 180 may proceed to adjust the DNN at 1070. For example, the NAP 180 use the received information in the at least one new CSI report as retraining samples (e.g., the estimated CSI) which are input to retrain and/or recalibrate the weights of the nodes of the DNN in a manner similar to the training discussed herein. The retraining may be performed offline or online at the NAP 180. Upon condition that the weights of the DNN have been recalibrated, the NAP 180 may send a finished retraining acknowledgement message to the WTRU 102. The NAP 180 may wait to receive a corresponding acknowledgement (e.g., ACK) from the WTRU 102 as shown in FIG. 10. After receiving the corresponding acknowledgment from the WTRU 102 at 1080, the NAP 180 may proceed to use the retrained DNN for precoder selection as described herein.

Figure 11:
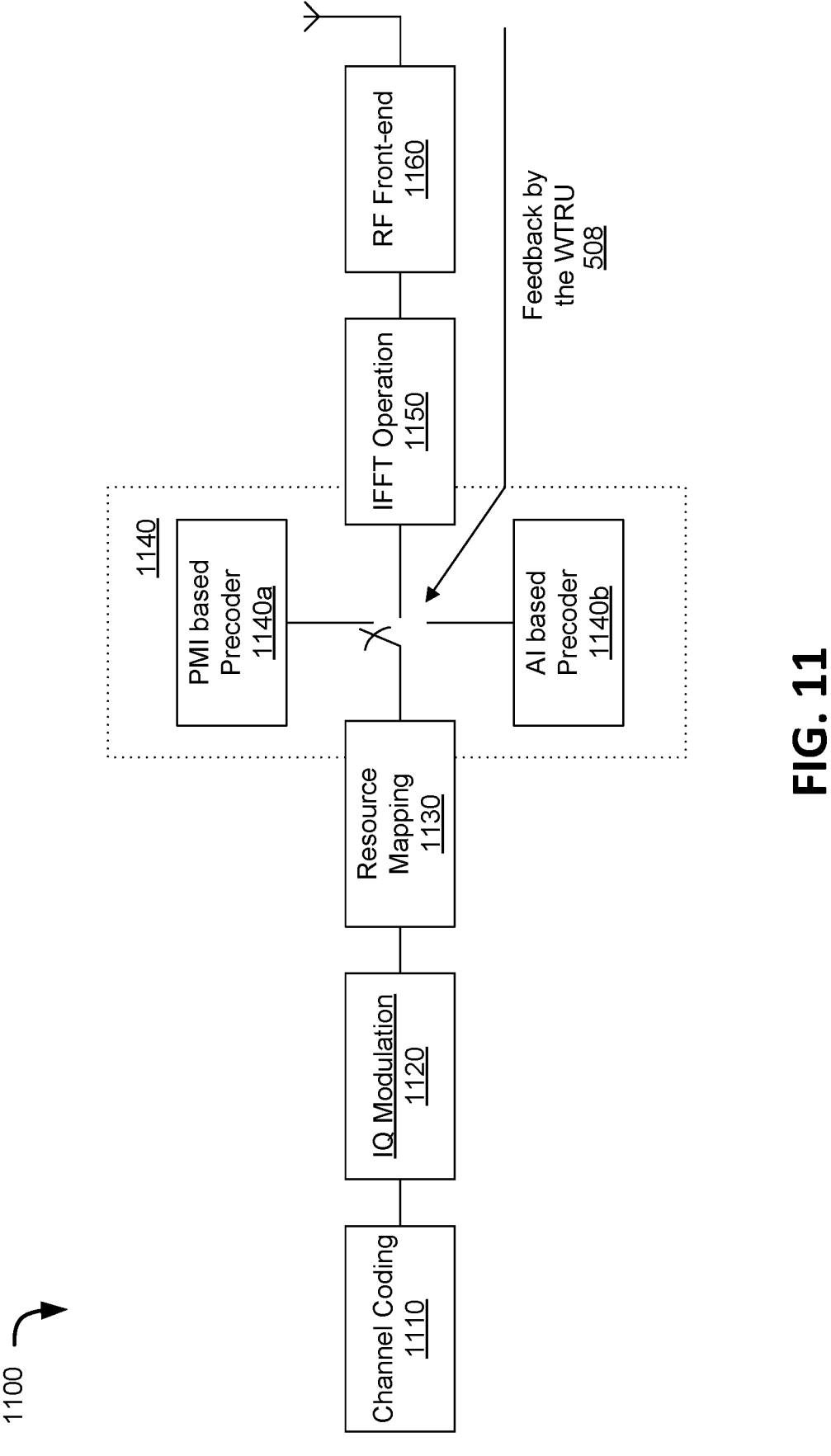
FIG. 11 is a diagram illustrating a representative transmission system using adaptive precoding according to certain embodiments.

FIG. 11 is a diagram illustrating a representative transmission system 1100 using adaptive precoding according to certain embodiments. In FIG. 11, a NAP 180 may be configured with to perform channel coding 1110, IQ modulation 1120, resource mapping 1130, precoding 1140, inverse fast Fourier transform (IFFT) processing 1150 and other RF front-end processing 1160 as may be generally understood by those skilled in the art. The NAP 180 may be configured to perform precoding using a first precoder 1140a and a second precoder 1140b. The first precoder 1140a may be configured as a precoding matrix indicator (PMI) based precoder. For example, the first precoder 1140a may select a precoder from a codebook according to a (e.g., received) PMI. The second precoder 1140b may be a trained DNN precoder as described herein.

In certain representative embodiments, the NAP 180 may be configured to (e.g., adaptively) switch between using the first precoder 1140a and the second precoder 1140b to spatially multiplex data. The switching between the first precoder 1140a and the second precoder 1140b may be based on feedback from the WTRU 102, such as ACK/NACK messages which include CSI reports (e.g., any of CQI, PMI, RI, and/or beams). For example, a WTRU 102 may send an ACK/NACK with a CSI report at a predetermined timing, such as after a predetermined number of data blocks or after every data block. If a NACK message, such as a single NACK or a moving average of NACKs, is received by the NAP 180, the NAP 180 may switch between the first precoder 1140a and the second precoder 1140b.

Assuming the PMI based precoder is active, upon receiving an ACK message in the feedback 508, the NAP 180 may continue to use the PMI based precoder. Upon receiving a NACK message (e.g., a single NACK or a moving average of NACKs) in the feedback 508, the NAP 180 may switch to using the trained DNN precoder.

Figure 12:
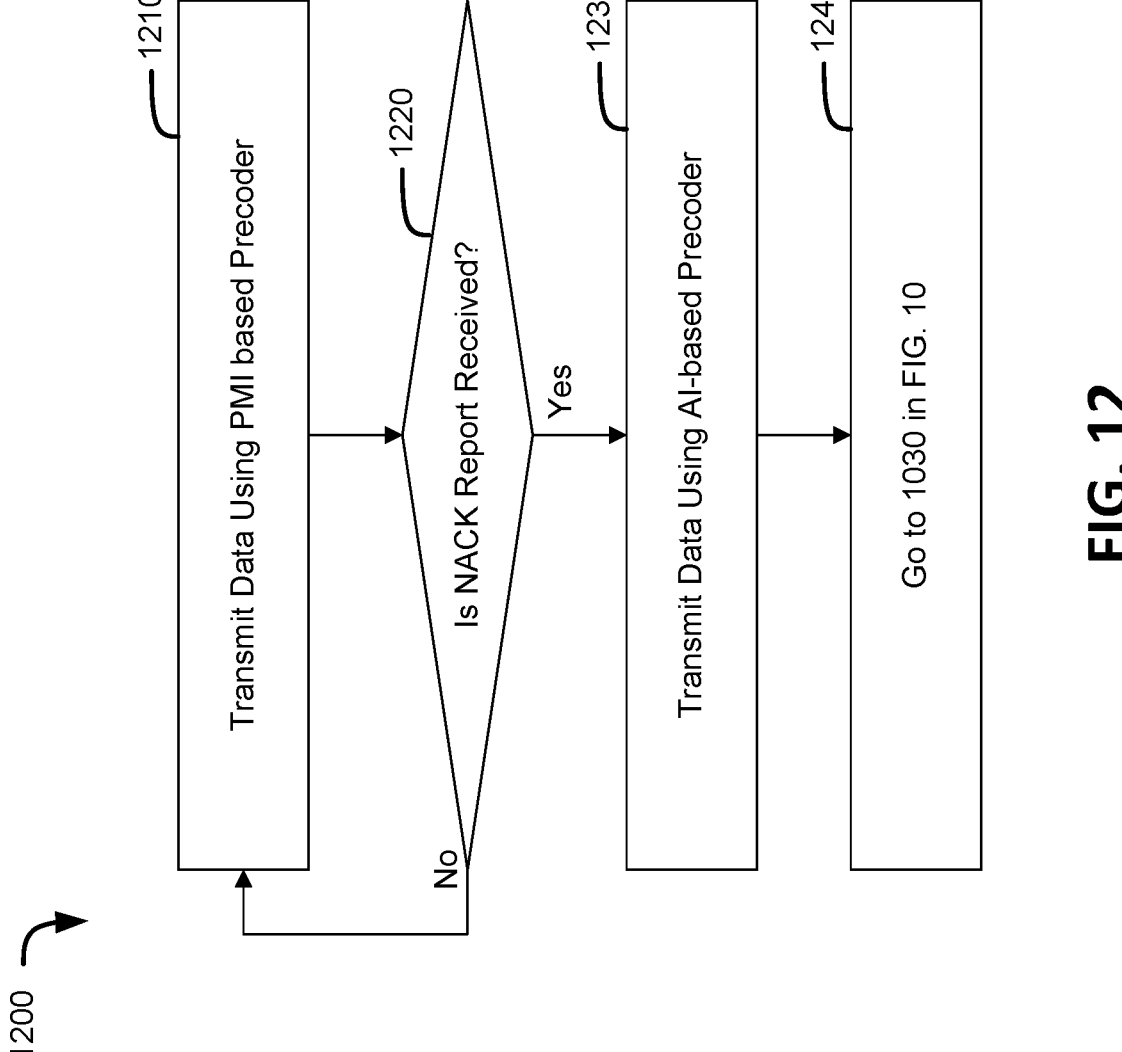
FIG. 12 is a is a flowchart illustrating a representative procedure using the transmission system of FIG. 11.

FIG. 12 is a flowchart illustrating a representative procedure 1200 using the transmission system of FIG. 11. The NAP 180 in FIG. 11 may (e.g., adaptively) switch between using the PMI based precoder 1140a and the trained DNN precoder 1140b. For example, the DNN precoder may be trained offline as described herein. One rationale for the switching in FIG. 11 may be to balance the tradeoff in complexity cost involved in employing the DNN precoder compared to that of the PMI based precoder. The adaptation between the PMI based precoder and the DNN precoder may be dependent on the feedback 508 by the WTRU 102.

As shown in FIG. 12, the NAP 180 may have a (e.g., initial) configuration where data to be transmitted is subjected to precoding with the PMI based precoder at 1210. Upon condition that the NAP 180 receives an ACK message from the WTRU 102 or upon condition that the NAP 180 does not receive a NACK message from the WTRU 102, the NAP 180 may continue at 1220 to use the PMI based precoder. Upon receiving a NACK message from the WTRU 102, the NAP 180 may switch at 1220 to the trained DNN precoder. The NAP 180 may then (e.g., after switching at 1220) transmit data using the trained DNN precoder at 1230. Thereafter, the procedure 1200 may continue at 1240 by going to 1030 in FIG. 10, for example.

FIG. 13 is a flowchart illustrating a representative procedure 1300 for configuring channel state information for adaptive precoder selection. The procedure 1300 may be implemented at a WTRU 102. As shown in FIG. 13, the procedure 1300 may include receiving, from a base station, a channel transmission of precoded data at 1310. For example, the base station may use the neural network described herein to determine an appropriate precoder matrix. The data to be transmitted may be precoded using the precoder matrix. At 1320, the WTRU 102 may send, to the base station, an acknowledgment or negative acknowledgement (ACK/NACK) message (e.g., associated with the channel transmission) which includes information indicating any of (1) channel statistics (e.g., variance and/or mean)

related to the channel transmission, and/or (2) a time correlation coefficient (e.g., p) related to the channel transmission. The WTRU 102 may receive, from the base station, information indicating precoder training initiation and/or training channel state information (CSI) configuration, the training CSI configuration including any of (1) a CSI reference signal (CSI-RS) density for one or more CSI-RSs, (2) a CSI-RS measurement interval for the one or more CSI-RSs, and/or (3) a CSI-RS periodicity for the one or more CSI-RSs at 1330. For example, the training CSI configuration may indicate the precoder training initiation. In some embodiments, the procedure may further include, at 1340, the WTRU 102 receiving information indicating a CSI report type associated with the training CSI configuration. At 1350 (e.g., after 1330 or 1340), the WTRU 102 may proceed to measure, during the measurement interval, the one or more CSI-RSs according to any of the CSI reference signal (CSI-RS) density, the CSI-RS measurement interval, and/or the CSI-RS periodicity of the training CSI configuration. For example, the measurement interval may be one or more slots. At 1360, the WTRU 102 may send, to the base station, a CSI report including information indicating values of one or more CSI parameters which relate to the measured one or more CSI-RSs. For example, the CSI report may include the CSI parameters which correspond to those indicated by the CSI report type requested by the base station at 1340. At 1370, the WTRU 102 may receive, from the base station, information indicating an updated CSI configuration for data transmission.

In certain representative embodiments, the updated CSI configuration received at 1370 may include any of (1) a CSI reference signal (CSI-RS) density for one or more CSI-RSs which is less than that of the training CSI configuration, and/or (2) a CSI-RS periodicity for the one or more CSI-RSs which is less than that of the training CSI configuration received at 1330.

In certain representative embodiments, the WTRU 102 may calculate the time correlation coefficient using any of a Bessel function, a Doppler spread amount of a wireless channel on which the channel transmission is received, and a sampling time of the wireless channel.

In certain representative embodiments, the information indicating the CSI report type includes a number of times (e.g., samples) the one or more CSI-RSs are to be measured during the measurement interval.

In certain representative embodiments, after receiving the information indicating the updated CSI configuration for data transmission at 1370, the WTRU 102 may receive, from the base station, another (e.g., second) channel transmission of precoded data.

In certain representative embodiments, after sending the CSI report including information indicating the values of the one or more CSI parameters which relate to the measured one or more CSI-RSs at 1360, the WTRU 102 may receive, from the base station, another (e.g., second) channel transmission of one or more precoded demodulation reference signals (DMRSs). The precoded DMRSs may indicate a recalibration of the weights of the neural network.

FIG. 14 is a flowchart illustrating a representative procedure 1400 for configuring channel state information for adaptive precoder selection. The procedure 1400 may be implemented at a base station (e.g., a network access point such as a gNB 180). As shown in FIG. 14, the procedure MOO may include the base station sending, to a WTRU 102, a channel transmission of precoded data which is precoded using first precoding information at 1410. For example, the base station may use previous CSI information and the (e.g., trained) neural network to determine the first precoding information. At 1420, the base station may receive, from the WTRU 102, an acknowledgment or negative acknowledgement (ACK/NACK) message which includes information indicating any of (1) channel statistics (e.g., variance and/or mean) related to the channel transmission, and/or (2) a time correlation coefficient (e.g., p) related to the channel transmission. At 1430, the base station may send, to the WTRU 102, information indicating precoder training initiation and/or training channel state information (CSI) configuration, the CSI configuration including any of (1) a CSI reference signal (CSI-RS) density for one or more CSI-RSs, (2) a CSI-RS measurement interval for the one or more CSI-RSs, and/or (3) a CSI-RS periodicity for the one or more CSI-RSs. For example, the training CSI configuration may indicate the precoder training initiation. For example, the measurement interval may be one or more slots. In some embodiments, the procedure 1400 may further include, at 1440, the WTRU 102 receiving information indicating a CSI report type associated with the training CSI configuration. At 1450 (e.g., after 1430 or 1440), the base station may receive, from the WTRU 102, a CSI report including information indicating values of one or more CSI parameters which relate to the measured one or more CSI-RSs during the time interval. After 1450, the base station may proceed to generate second precoding information using the CSI report at 1460. For example, the base station may use the CSI information in the received CSI report at 1450 to recalibrate the neural network. The second precoding information may be generated from the recalibrated neural network. At 1470, the base station may send, to the WTRU 102, information indicating an updated CSI configuration for data transmission.

In certain representative embodiments, the updated CSI configuration sent at 1470 may include any of (1) a CSI reference signal (CSI-RS) density for one or more CSI-RSs which is less than that of the training CSI configuration, and/or (2) a CSI-RS periodicity for the one or more CSI-RSs which is less than that of the training CSI configuration sent at 1430.

In certain representative embodiments, the WTRU 102 may calculate the time correlation coefficient using any of a Bessel function, a Doppler spread amount of a wireless channel on which the channel transmission is received, and a sampling time of the wireless channel.

In certain representative embodiments, the information indicating the CSI report type includes a number of times (e.g., samples) the one or more CSI-RSs are to be measured during the measurement interval (e.g., one or more slots in which CSI-RSs are transmitted for purposes of precoder training and/or recalibration).

In certain representative embodiments, after sending the information indicating the updated CSI configuration for data transmission at 1470, the WTRU 102 may receive, from the base station, another (e.g., second) channel transmission of precoded data. The precoded data may be precoded by the base station using the second precoding information determined by the recalibrated neural network.

In certain representative embodiments, after sending the CSI report including information indicating the values of the one or more CSI parameters which relate to the measured one or more CSI-RSs at 1460, the base station may transmit another (e.g., second) channel transmission of one or more precoded demodulation reference signals (DMRSs) to the WTRU 102. The precoded DMRSs may indicate a recalibration of the weights of the neural network.

In certain representative embodiments, after sending the CSI report including information indicating the values of the one or more CSI parameters which relate to the measured one or more CSI-RSs at 1460, the base station may transmit to the WTRU 102 information indicating the updated weights of the recalibrated neural network.

FIG. 15 is a flowchart illustrating a representative procedure 1500 for adaptive precoder selection recalibration. The procedure 1500 may be implemented at a WTRU 102. As shown in FIG. 15, the procedure 1500 may include the WTRU 102 sending, to the base station (e.g., a NAP 180 such as a gNB), an acknowledgment or negative acknowledgement (ACKNACK) message which includes information indicating any of (1) channel statistics related to a channel transmission, and/or (2) a time correlation coefficient related to the channel transmission at 1510. At 1520, the WTRU 102 may receive, from the base station, information indicating precoder training initiation and/or a training channel state information (CSI) configuration for one or more CSI RSs associated with a measurement interval (e.g., one or more slots). For example, the training CSI configuration may indicate the precoder training initiation. In some embodiments, the procedure may further include, at 1530, the WTRU 102 receiving, from the base station, information indicating a CSI report type associated with the training CSI configuration. After, the WTRU 102 may proceed at 1540 (e.g., after 1520 or 1530) with measuring, during the measurement interval, the one or more CSI-RSs. After 1540, the WTRU 102 may send, to the base station, a CSI report including information indicating values of one or more CSI parameters which relate to the measured one or more CSI-RSs at 1550. At 1560, the WTRU 102 may receive, from the base station, information indicating precoder training completion. For example, the WTRU 102 may receive one or more updated weights of a neural network (e.g., recalibrated using the CSI report at 1540) associated with selecting precoding information for precoding data transmission from the base station at 1560. As another example, the WTRU 102 may receive a data transmission including one or more precoded demodulation reference signals (DMRSs) at 1560 which may be precoded after recalibration at the base station using the CSI report at 1540.

In certain representative embodiments, the training channel state information (CSI) configuration may include any of (1) a CSI reference signal (CSI-RS) density for one or more CSI-RSs, (2) a CSI-RS measurement interval for the one or more CSI-RSs, and/or (3) a CSI-RS periodicity for the one or more CSI-RSs.

In certain representative embodiments, the information indicating the CSI report type includes a number of times (e.g., samples) the one or more CSI-RSs are to be measured during the measurement interval.

In certain representative embodiments, the WTRU 102 may receive information indicating an updated CSI configuration for data transmission after 1560. The updated CSI configuration may, for example, include any of (1) a CSI reference signal (CSI-RS) density for one or more CSI-RSs which is less than that of the training CSI configuration, and/or (2) a CSI-RS periodicity for the one or more CSI-RSs which is less than that of the training CSI configuration For example, after receiving the information indicating the updated CSI configuration, the WTRU 102 may receive, from the base station, a channel transmission of precoded data after 1560.

FIG. 16 is a flowchart illustrating a representative procedure 1600 for adaptive precoder selection recalibration. The procedure 1600 may be implemented at a base station (e.g., a network access point such as a gNB 180). As shown in FIG. 16, the procedure 1600 may include the base station receiving, from a WTRU 102, an acknowledgment or negative acknowledgement (ACKNACK) message which includes information indicating any of (1) channel statistics related to a channel transmission from the base station, and/or (2) a time correlation coefficient related to the channel transmission at 1610. At 1620, the base station may send, to the WTRU 102, information indicating a precoder training initiation and/or training channel state information (CSI) configuration for one or more CSI RSs associated with a measurement interval. For example, the training CSI configuration including any of (1) a CSI reference signal (CSI-RS) density for one or more CSI-RSs, (2) a CSI-RS measurement interval for the one or more CSI-RSs, and/or (3) a CSI-RS periodicity for the one or more CSI-RSs. In some embodiments, the procedure may further include, at 1630, the base station sending, to the WTRU 102, information indicating a CSI report type associated with the training CSI configuration. At 1640 (e.g., after 1620 or 1630), the base station may send, to the WTRU 102, the one or more CSI-RSs (e.g., in accordance with the training CSI configuration). At 1650, the base station may receive, from the WTRU 102, a CSI report including information indicating values of one or more CSI parameters (e.g., in accordance with the CSI report type) which relate to the measured one or more CSI-RSs (e.g., during the measurement interval). After 1650, the base station may perform recalibrating of a neural network (e.g., as described herein) using the values of the one or more CSI parameters and/or the ACK/NACK message (e.g., NACK message) at 1660. After 1660, the base station may generate (e.g., new or updated) precoding information using the recalibrated neural network at 1670. After, the base station may, at 1680, proceed with sending, to the WTRU 102, a channel transmission of data which is precoded using the precoding information generated at 1670.

In certain representative embodiments, the base station may send an updated CSI configuration (e.g., after the measurement interval or after recalibrating the neural network). The updated CSI configuration may be for data transmission and may include any of (1) a CSI reference signal (CSI-RS) density for one or more CSI-RSs which is less than that of the training CSI configuration, and/or (2) a CSI-RS periodicity for the one or more CSI-RSs which is less than that of the training CSI configuration received at 1330.

In certain representative embodiments, the information indicating the CSI report type includes a number of times (e.g., samples) the one or more CSI-RSs are to be measured during the measurement interval.

In certain representative embodiments, the base station may send information relating to the recalibrated neural network to the WTRU 102. For example, the base station may transmit to the WTRU 102 information indicating the updated weights of the recalibrated neural network. As another example, the channel transmission to the WTRU 102 at 1680 may include one or more precoded demodulation reference signals (DMRSs). The precoded DMRSs may indicate a recalibration of the weights of the neural network.

FIG. 17 is a flowchart illustrating a representative procedure 1700 for adaptive precoder selection. The procedure 1700 may be implemented at a base station (e.g., a network access point such as a gNB 180). As shown in FIG. 17, the procedure 1700 may include the base station receiving, from the WTRU 102, a first channel state information (CSI) report including information indicating a first set of values of one or more CSI parameters associated with a wireless channel at 1710. For example, the CSI report may be responsive to and/or associated with the reception of a training CSI configuration and/or a CSI report request as described herein. At 1720, the base station may determine first precoding information using a neural network to which the first set of values of the one or more CSI parameters are input. For example, it may be assumed that the DNN described herein has been previously trained and may use the input CSI parameter values (e.g., outdated CSI) to select the first precoding information (e.g., precoder matrix) for a (e.g., next) transmission. In certain embodiments, the base station may perform recalibration of the neural network prior to a next transmission. After 1720, the base station may proceed to send, to the WTRU 102, a first transmission of data using the wireless channel, and the data may be precoded using the first precoding information at 1730. At 1740, the base station may receive, from the WTRU 102, a second channel state information (CSI) report including information indicating a second set of values of the one or more CSI parameters associated with the wireless channel. For example, the CSI report may be responsive to and/or associated with the reception of a training CSI configuration and/or a CSI report request as described herein. After 1740, the base station may determine second precoding information using the neural network to which the second set of values of the one or more CSI parameters are input at 1750. For example, it may be assumed that the DNN described herein has been previously trained and may use the input CSI parameter values (e.g., outdated CSI) to select the second precoding information (e.g., precoder matrix) for a (e.g., next) transmission. In certain embodiments, the base station may perform recalibration of the neural network prior to the next (e.g., second) transmission. At 1760, the base station may proceed to send, to the WTRU 102, a second transmission of data using the wireless channel, and the data may be precoded using the second precoding information.

FIG. 18 is a flowchart illustrating a representative procedure 1800 for adaptive precoder selection. The procedure 1800 may be implemented at a WTRU 102. As shown in FIG. 18, the procedure 1800 may include the WTRU 102 sending, to a base station (e.g., a network access point such as a gNB 180), a first channel state information (CSI) report including information indicating a first set of values of one or more CSI parameters associated with a wireless channel at 1810. For example, the CSI report may be responsive to and/or associated with the reception of a training CSI configuration and/or a CSI report request as described herein. At 1820, the WTRU 102 may receive, from the base station, a first transmission of data using the wireless channel, and the first transmission of data may be precoded by the base station using first precoding information. For example, it may be assumed that the DNN described herein has been previously trained and the base station may use the input CSI parameter values (e.g., outdated CSI) to select the first precoding information (e.g., precoder matrix) for a (e.g., next) transmission. In certain embodiments, the base station may perform recalibration of the neural network prior to the next transmission. After 1820, the WTRU 102 may send, to the base station, a second channel state information (CSI) report including information indicating a second set of values of the one or more CSI parameters associated with the wireless channel at 1830. For example, the CSI report may be responsive to and/or associated with the reception of a training CSI configuration and/or a CSI report request as described herein. For example, it may be assumed that the DNN described herein has been previously trained and the base station may use the input CSI parameter values (e.g., outdated CSI) to select the first precoding information (e.g., precoder matrix) for a (e.g., next) transmission. In certain embodiments, the base station may perform recalibration of the neural network prior to the next transmission. After 1830, the WTRU 102 may receive, from the base station, a second transmission of data using the wireless channel, and the second transmission of data may be precoded by the base station using the second precoding information.

Although the solutions described herein consider New Radio (NR), 5G or LTE, LTE-A specific, tera bit or tera Hz communication protocols, it is understood that the embodiments described herein are not restricted to these scenarios and are applicable to other wireless systems as well.

In certain representative embodiments, a method may be implemented by a WTRU 102 and the method may include receiving (e.g., by the WTRU 102 from a NAP 180) a channel-state information (CSI) configuration indicator regarding at least one channel-state information reference signal (CSI-RS) and a CSI reporting indicator regarding the at least one CSI-RS. The method may further include receiving (e.g., by the WTRU 102 from a NAP 180) the at least one CSI-RS based on the CSI configuration indicator. The method may further include generating (e.g., by the WTRU 102) a CSI report based on the CSI reporting indicator and the received at least one CSI-RS, and transmitting (e.g., by the WTRU 102 to a NAP 180) the CSI report.

In certain representative embodiments, the method may also include, prior to the receiving the CSI configuration indicator and the CSI reporting indicator, receiving (e.g., by the WTRU 102 from the NAP 180) a data transmission over a wireless channel. The method may further include generating (e.g., by the WTRU 102) CSI regarding the data transmission. The method may also further include transmitting (e.g., by the WTRU 102 to the NAP 180) a message including a time correlation coefficient of the wireless channel and/or CSI statistics indicator for the CSI regarding the data transmission.

In certain representative embodiments, the CSI regarding the data transmission may be transmitted in an ACK/NACK message which further includes a bit error rate (BER) of the data transmission.

In certain representative embodiments, the channel statistics indicator may include information indicating a variance of the wireless channel and/or a mean of the wireless channel.

In certain representative embodiments, the method may also include, calculating (e.g., by the WTRU 102) the time correlation coefficient of the wireless channel using a Bessel function, a Doppler spread amount of the wireless channel, and/or a sampling time of the wireless channel.

In certain representative embodiments, the time correlation coefficient may be calculated according to $\rho = J_0(2\pi f_d T_s)$, where $\rho$ is the time correlation coefficient, $J_0$ is a Bessel function of the first kind of zero order, $f_d$ is the Doppler spread amount, and $T_s$ is the sampling time.

In certain representative embodiments, the CSI configuration indicator regarding the at least one CSI-RS may indicate any of a CSI-RS transmission timing, a periodicity type, and/or a number of symbols of the at least one CSI-RS to be transmitted.

In certain representative embodiments, the CSI reporting indicator regarding the at least one CSI-RS may include any of a precoder-matrix indicator (PMI), a channel quality indicator (CQI), a rank indicator (RI), a beam pair indicator, and/or a number of samples of the at least one CSI-RS.

In certain representative embodiments, the CSI report may include any of a precoder-matrix indicator (PMI), a channel quality indicator (CQI), a rank indicator (RI), and/or a beam pair indicator regarding the at least one CSI-RS.

In certain representative embodiments, the method may also include, prior to the receiving the CSI configuration indicator and the CSI reporting indicator, receiving (e.g., by the WTRU 102 from the NAP 180) a data transmission precoded with a first precoder over a wireless channel. The method may also include generating (e.g., by the WTRU 102) CSI regarding the data transmission, and transmitting (e.g., by the WTRU 102 to the NAP 180) an indicator of a time correlation coefficient of the wireless channel and/or a channel statistics indicator for the CSI regarding the data transmission. The method may also include, after transmitting the CSI report, receiving (e.g., by the WTRU 102 from the NAP 180) another data transmission over the wireless channel, and the other data transmission may be precoded with a second precoder based on the CSI report.

In certain representative embodiments, the method may also include receiving (e.g., by the WTRU 102 from the NAP 180) an indicator that the NAP 180 is requesting neural network precoding retraining prior to receiving the at least one CSI-RS based on the CSI configuration indicator.

In certain representative embodiments, a WTRU 102 may include a processor and a transceiver which are configured to receive (e.g., by the WTRU 102 from a NAP 180) a channel-state information (CSI) configuration indicator regarding at least one channel-state information reference signal (CSI-RS) and a CSI reporting indicator regarding the at least one CSI-RS. The processor and transceiver may be further configured to receive (e.g., by the WTRU 102 from a NAP 180) the at least one CSI-RS based on the CSI configuration indicator. The processor and transceiver may be further configured to generate (e.g., by the WTRU 102) a CSI report based on the CSI reporting indicator and the received at least one CSI-RS, and transmit (e.g., by the WTRU 102 to a NAP 180) the CSI report.

In certain representative embodiments, the processor and transceiver may be further configured to, prior to the reception of the CSI configuration indicator and the CSI reporting indicator, receive (e.g., from the NAP 180) a data transmission over a wireless channel. The processor and transceiver may be further configured to generate (e.g., by the WTRU 102) CSI regarding the data transmission. The processor and transceiver may be further configured to transmit (e.g., by the WTRU 102 to the NAP 180) a message including a time correlation coefficient of the wireless channel and/or CSI statistics indicator for the CSI regarding the data transmission.

In certain representative embodiments, the CSI regarding the data transmission may be transmitted in an ACK/NACK message which further includes a bit error rate (BER) of the data transmission.

In certain representative embodiments, the channel statistics indicator may include information indicating a variance of the wireless channel and/or a mean of the wireless channel.

In certain representative embodiments, the processor and transceiver may be further configured to calculate (e.g., by the WTRU 102) the time correlation coefficient of the wireless channel using a Bessel function, a Doppler spread amount of the wireless channel, and/or a sampling time of the wireless channel.

In certain representative embodiments, the time correlation coefficient may be calculated according to $\rho = J_0(2\pi f_d T_s)$, where $\rho$ is the time correlation coefficient, $J_0$ is a Bessel function of the first kind of zero order, $f_d$ is the Doppler spread amount, and $T_s$ is the sampling time.

In certain representative embodiments, the CSI configuration indicator regarding the at least one CSI-RS may indicate any of a CSI-RS transmission timing, a periodicity type, and/or a number of symbols of the at least one CSI-RS to be transmitted.

In certain representative embodiments, the CSI reporting indicator regarding the at least one CSI-RS may include any of a precoder-matrix indicator (PMI), a channel quality indicator (CQI), a rank indicator (RI), a beam pair indicator, and/or a number of samples of the at least one CSI-RS.

In certain representative embodiments, the CSI report may include any of a precoder-matrix indicator (PMI), a channel quality indicator (CQI), a rank indicator (RI), and/or a beam pair indicator regarding the at least one CSI-RS.

In certain representative embodiments, the processor and transceiver may be further configured to, prior to the reception of the CSI configuration indicator and the CSI reporting indicator, receive (e.g., by the WTRU 102 from the NAP 180) a data transmission precoded with a first precoder over a wireless channel. The processor and transceiver may be further configured to generate (e.g., by the WTRU 102) CSI regarding the data transmission, and transmit (e.g., by the WTRU 102 to the NAP 180) an indicator of a time correlation coefficient of the wireless channel and/or a channel statistics indicator for the CSI regarding the data transmission. The processor and transceiver may be further configured to, after transmission of the CSI report, receive (e.g., by the WTRU 102 from the NAP 180) another data transmission over the wireless channel, and the other data transmission may be precoded with a second precoder based on the CSI report.

In certain representative embodiments, the processor and transceiver may be further configured to receive (e.g., by the WTRU 102 from the NAP 180) an indicator that the NAP 180 is requesting neural network precoding retraining prior to receiving the at least one CSI-RS based on the CSI configuration indicator.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include; but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

What is claimed is:

1. A method implemented by a base station, the method comprising:

sending, to a wireless transmit/receive unit (WTRU) a first channel transmission precoded using first precoding information, the first channel transmission including data;

receiving, from the WTRU, an acknowledgment or negative acknowledgment (ACK/NACK) message associated with the first channel transmission, the message including information indicating any one of or any combination of (1) channel statistics related to the first channel transmission, and (2) a time correlation coefficient associated with a Doppler spread of the first channel transmission;

sending, to the WTRU, information indicating a training channel state information (CSI) configuration, the training CSI configuration including any one of or any combination of (1) a CSI reference signal (CSI-RS) density for one or more CSI-RSs, (2) a CSI-RS measurement interval for the one or more CSI-RSs, and/or (3) a CSI-RS periodicity for the one or more CSI-RSs;

receiving, from the WTRU, a CSI report including information indicating values of one or more CSI parameters that are derived based on the one or more CSI-RSs during the time interval;

generating second precoding information based on the CSI report; and responsive to generating the second precoding information, sending, to the WTRU, information indicating an updated CSI configuration.

2. The method of claim 1, further comprising:

after sending the information indicating the updated CSI configuration, sending, to the WTRU, a second channel transmission precoded using the second precoding information, the second channel transmission including data.

3. The method of claim 1, wherein the time correlation coefficient is indicative of a degree of similarity of CSI associated with the first channel transmission.

4. The method of claim 1, wherein the time correlation coefficient is calculated according to:

$\rho = J_0(2\pi f_d T_s)$, where $J_0$ is a Bessel function, $f_d$ is the Doppler spread, and $T_s$ is a sampling time.

5. The method of claim 1, further comprising:

after sending the information indicating the training CSI configuration, sending the one or more CSI-RSs according to any of the CSI-RS density, the CSI-RS measurement interval, and/or the CSI-RS periodicity of the indicated CSI configuration.

6. The method of claim 1, further comprising:

updating one or more weights of a neural network using the CSI report, wherein the first precoding information is obtained from the neural network prior to the updating of the one or more weights, and the second precoding information is obtained from the neural network after the updating of the one or more weights.

7. The method of claim 1, wherein the CSI-RS measurement interval is at least one slot.

8. The method of claim 1, wherein the information indicating the training CSI configuration is for network-side data collection.

9. The method of claim 8, wherein the network-side data collection is associated with CSI measurements, which are used for training data to update precoder selection.

10. The method of claim 1, wherein the updated CSI configuration is determined based at least in part on the CSI report.

11. A base station comprising:

a processor and a transceiver configured to:

send, to a wireless transmit/receive unit (WTRU) a first channel transmission which is precoded using first precoding information, the first channel transmission including data;

receive, from the WTRU, an acknowledgment or negative acknowledgment (ACK/NACK) message associated with the first channel transmission, the message including information indicating any one of or any combination of (1) channel statistics related to the first channel transmission, and (2) a time correlation coefficient associated with a Doppler spread of the first channel transmission;

send, to the WTRU, information indicating a training channel state information (CSI) configuration, the training CSI configuration including any one of or any combination of (1) a CSI reference signal (CSI-RS) density for one or more CSI-RSs, (2) a CSI-RS measurement interval for the one or more CSI-RSs, and/or (3) a CSI-RS periodicity for the one or more CSI-RSs;

receive, from the WTRU, a CSI report including information indicating values of one or more CSI parameters that are derived based on the one or more CSI-RSs during the time interval;

generate second precoding information based on the CSI report; and responsive to generting the seconding precoding information, send, to the WTRU, information indicating an updated CSI configuration.

12. The base station of claim 11, wherein the processor and the transceiver are configured to:

after sending the information indicating the updated CSI configuration, send, to the WTRU, a second channel transmission which is precoded using the second precoding information, the second channel transmission including data.

13. The base station of claim 11, wherein the time correlation coefficient is indicative of a degree of similarity of CSI associated with the first channel transmission.

14. The base station of claim 11, wherein the time correlation coefficient is calculated according to:

$\rho = J_0(2\pi f_d T_s)$, where $J_0$ is a Bessel function, $f_d$ is the Doppler spread, and $T_s$ is a sampling time.

15. The base station of claim 11, wherein the processor and the transceiver are configured to:

after sending the information indicating the training CSI configuration, send the one or more CSI-RSs according to any of the CSI-RS density, the CSI-RS measurement interval, and/or the CSI-RS periodicity of the indicated CSI configuration.

16. The base station of claim 11, wherein the processor and the transceiver are configured to:

update one or more weights of a neural network using the CSI report, wherein the first precoding information is obtained from the neural network prior to the updating of the one or more weights, and the second precoding information is obtained from the neural network after the updating of the one or more weights.

17. The base station of claim 11, wherein the CSI-RS measurement interval is at least one slot.

18. The base station of claim 11, wherein the information indicating the training CSI configuration is for network-side data collection.

19. The method of claim 18, wherein the network-side data collection is associated with CSI measurements, which are used for training data to update precoder selection.

20. The base station of claim 11, wherein the updated CSI configuration is determined based at least in part on the CSI report.

* * * * *